United States Patent
Wu et al.

(10) Patent No.: US 9,451,516 B2
(45) Date of Patent: Sep. 20, 2016

(54) METHOD FOR DATA TRANSMISSION, OFFLOAD POINT DEVICE, USER EQUIPMENT AND SYSTEM

(71) Applicant: Huawei Technologies Co., Ltd., Shenzhen (CN)

(72) Inventors: Ye Wu, Shenzhen (CN); Wei Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 164 days.

(21) Appl. No.: 14/189,539

(22) Filed: Feb. 25, 2014

(65) Prior Publication Data

US 2014/0177448 A1    Jun. 26, 2014

(30) Foreign Application Priority Data

Aug. 26, 2011  (CN) .......................... 2011 1 0249387

(51) Int. Cl.
*H04W 36/22* (2009.01)
*H04W 28/18* (2009.01)
*H04W 36/14* (2009.01)
(Continued)

(52) U.S. Cl.
CPC ............. *H04W 36/22* (2013.01); *H04W 28/18* (2013.01); *H04W 36/14* (2013.01); *H04W 36/24* (2013.01); *H04W 40/24* (2013.01)

(58) Field of Classification Search
CPC ........ H04Q 7/38; H04W 4/02; H04W 28/18; H04W 36/04; H04W 36/22; H04W 40/24; H04W 68/00; G06F 15/16
See application file for complete search history.

(56) References Cited

U.S. PATENT DOCUMENTS

| 2006/0211447 A1 | 9/2006 | Purkayastha et al. |
| 2007/0026861 A1 | 2/2007 | Kuhn et al. |
| 2007/0263574 A1 | 11/2007 | Lu et al. |

(Continued)

FOREIGN PATENT DOCUMENTS

| CN | 1761220 A | 4/2006 |
| CN | 101473680 A | 7/2009 |

(Continued)

OTHER PUBLICATIONS

WO 2011/097321 A2 Title: Utilizing Policies for Offload and Flow Mobility in Wireless Communications Inventor: Gerardo Giaretta et al. Assignee: Qualcomm Incorporated Fiiling Date: Feb. 2, 2011 Publication Date: Aug. 11, 2011.*

(Continued)

*Primary Examiner* — Andrew Lai
*Assistant Examiner* — Leon Andrews
(74) *Attorney, Agent, or Firm* — Brinks Gilson & Lione

(57) ABSTRACT

The method for data transmission includes: updating, when a first air interface is unavailable, connection context information corresponding to service(s) of a user equipment on the first air interface, wherein the user equipment is connected to a core network through a first access network via the first air interface; sending a first message to the user equipment, wherein the first message carries updating information related to the updated connection context information; and performing data transmission with the user equipment according to the updated connection context information. This technical solution helps preventing services corresponding to data transmission performed via the first air interface from being interrupted when the first air interface is unavailable.

29 Claims, 13 Drawing Sheets

```
100  ┌─────────────────────────────────────────────────────┐
     │ updating, when a first air interface is unavailable,│
     │ connection context information corresponding to     │  S110
     │ service(s) of a user equipment on the first air     │
     │ interface                                           │
     └─────────────────────────────────────────────────────┘
                              │
                              ▼
     ┌─────────────────────────────────────────────────────┐
     │ sending a first message to the user equipment,      │
     │ wherein the first message carries updating          │  S120
     │ information related to the updated connection       │
     │ context information                                 │
     └─────────────────────────────────────────────────────┘
                              │
                              ▼
     ┌─────────────────────────────────────────────────────┐
     │ performing data transmission with the user equipment│  S130
     │ according to the updated connection context         │
     │ information                                         │
     └─────────────────────────────────────────────────────┘
```

(51) Int. Cl.
*H04W 40/24* (2009.01)
*H04W 36/24* (2009.01)

(56) References Cited

U.S. PATENT DOCUMENTS

| | | |
|---|---|---|
| 2008/0014957 A1 | 1/2008 | Ore |
| 2008/0299954 A1* | 12/2008 | Wright .................... H04W 4/02 455/414.1 |
| 2009/0305701 A1 | 12/2009 | Giaretta et al. |
| 2010/0128694 A1 | 5/2010 | Choi-Grogan |
| 2010/0312846 A1* | 12/2010 | Lu ......................... H04W 68/00 709/206 |
| 2011/0317560 A1 | 12/2011 | Aramoto et al. |

FOREIGN PATENT DOCUMENTS

| | | |
|---|---|---|
| EP | 2375818 A1 | 10/2011 |
| RU | 2 292 665 C2 | 1/2007 |
| WO | WO 01/67788 A2 | 9/2001 |
| WO | WO 2010/056547 A1 | 5/2010 |
| WO | WO 2010/079715 A1 | 7/2010 |
| WO | WO 2010/080966 A1 | 7/2010 |
| WO | WO 2011/014335 A2 | 2/2011 |
| WO | WO 2011/097321 A2 | 8/2011 |

OTHER PUBLICATIONS

WO 2011097321 A2 Title: Utilizing Policies for Offload and Flow Mobility in Wireless Communications Applicant: Qualcomm Incorporated Author: Giaretta et al. Priority Date: Feb. 5, 2010.*
Lte, "3$^{rd}$ Generation Partnership Project; Technical Specification Group Services and System Aspects; Multi access PDN connectivity and IP flow mobility" (Release 9) 3GPP TR 23.861, V.1.2.0, May 2009, 48 pages.

* cited by examiner

METHOD FOR DATA TRANSMISSION, OFFLOAD POINT DEVICE, USER EQUIPMENT AND SYSTEM

CROSS-REFERENCE TO RELATED APPLICATIONS

This application is a continuation of International Application No. PCT/CN2012/080635, filed on Aug. 27, 2012, which claims priority to Chinese patent application No. 201110249387.0 filed on Aug. 26, 2011, both of which are hereby incorporated by reference in their entireties.

TECHNICAL FIELD

The present disclosure relates to the field of communications, and more particularly, to a method for data transmission, an offload point device, a user equipment and a system in the field of communications.

BACKGROUND

With the development of wireless communication technology, various modes, such as GSM (Global System of Mobile Communication, global system of mobile communication), UMTS (Universal Mobile Telecommunications System, universal mobile telecommunications system), LTE (Long Term Evolution, long term evolution), LTE-A (Long Term Evolution-Advanced, long term evolution-advanced) and the like, are mutually merged in their respective development processes, and on an access network side, particularly, various radio modes are evolving towards a direction of having unified RRM (Radio Resource Management, radio resource management).

When multiple radio access technology (Multiple Radio Access Technology, Multi-RAT) supports a user equipment (User Equipment, UE) in performing data transmissions in multiple modes at a same time, both throughput of a user and user experience may be improved. For example, in a WiFi offloading technology, WLAN (Wireless Local Area Network, wireless local area network) may be used as an access network of a 3G (The third Generation, the third generation) core network, whereby UE may perform data transmissions via a WiFi air interface and a 3G air interface simultaneously. Under a circumstance that WiFi offloading is realized in a tight coupling manner, a user equipment and a packet network may interchange data through a 3G core network, a 3G access network and a 3G air interface provided by the 3G access network, or through a 3G core network, a WLAN access network and a WiFi air interface provided by the WLAN access network, or through a 3G air interface and a WiFi air interface at a same time. Although the WLAN and the 3G network are taken as an example for illustrating the tight coupling manner in the aforementioned example, persons skilled in the art may think of the tight coupling manner also present in other network architecture, such as WLAN and LTE network.

In an existing Multi-RAT scenario, if data transmission is provided for a UE via a plurality of air interfaces at a same time, a service currently carried by an air interface is interrupted when the air interface is unavailable, leading to a failure of data transmission on the air interface. In the absence of a mechanism for processing the service carried by the unavailable air interface under the Multi-RAT condition, data transmission of the UE is affected.

SUMMARY

The present disclosure provides a method for data transmission, an offload point device, a user equipment and a system, which may process a service carried by an unavailable air interface under a Multi-RAT scenario, so as to provide a mechanism for processing breakdown of an air interface for a data offloading transmission mechanism and help preventing all services corresponding to a data transmission of UE performed via the air interface from being interrupted.

In one aspect, the present disclosure provides a method for data transmission, including: updating, when a first air interface is unavailable, connection context information corresponding to service(s) of a user equipment on the first air interface, wherein the user equipment is connected to a core network through a first access network via the first air interface; sending a first message to the user equipment, wherein the first message carries updating information related to the updated connection context information, such that the user equipment updates connection context information currently corresponding to the service(s) on the first air interface according to the updating information so as to obtain the updated connection context information; and performing data transmission with the user equipment according to the updated connection context information.

In another aspect, the present disclosure provides a method for data transmission, including: receiving a first message sent by an offload point device when a first air interface is unavailable, wherein the first message carries updating information related to connection context information corresponding to service(s) of the user equipment on the first air interface that is updated by the offload point device when the first air interface is unavailable, and the user equipment is connected to a core network through a first access network via the first air interface; updating, according to the updating information, connection context information currently corresponding to the service(s) on the first air interface; and performing data transmission with the offload point device according to the updated connection context information.

In a further aspect, the present disclosure provides an offload point device, including: an updating module, for updating, when a first air interface is unavailable, connection context information corresponding to service(s) of a user equipment on the first air interface, wherein the user equipment is connected to a core network through a first access network via the first air interface; a sending module, for sending a first message to the user equipment, wherein the first message carries updating information related to the updated connection context information, such that the user equipment updates connection context information currently corresponding to the service(s) on the first air interface according to the updating information so as to obtain the updated connection context information; and a transmitting module, for performing data transmission with the user equipment according to the updated connection context information.

In a still further aspect, the present disclosure provides a user equipment, including: a receiving module, for receiving a first message sent by an offload point device when a first air interface is unavailable, wherein the first message carries updating information related to connection context information corresponding to service(s) of the user equipment on the first air interface that is updated by the offload point device when the first air interface is unavailable, and the user equipment is connected to a core network through a first access network via the first air interface; an updating module, for updating, according to the updating information, connection context information currently corresponding to the service(s) on the first air interface; and a transmitting module, for performing data transmission with the offload point device according to the updated connection context information.

In a still further aspect, the present disclosure provides a system for data transmission, including offload point device and a user equipment, wherein the offload point device is used for updating connection context information corresponding to service(s) of a user equipment on a first air interface when the first air interface is unavailable, wherein the user equipment is connected to a core network through a first access network via the first air interface; sending a first message to the user equipment, wherein the first message carries updating information related to the updated connection context information, such that the user equipment updates connection context information currently corresponding to the service(s) on the first air interface according to the updating information so as to obtain the updated connection context information; and performing data transmission with the user equipment according to the updated connection context information; and the user equipment is used for receiving, when a first air interface is unavailable, a first message sent by an offload point device, wherein the first message carries updating information related to connection context information corresponding to service(s) of the user equipment on the first air interface that is updated by the offload point device when the first air interface is unavailable, and the user equipment is connected to a core network through a first access network via the first air interface; updating, according to the updating information, connection context information currently corresponding to the service(s) on the first air interface; and performing data transmission with the offload point device according to the updated connection context information.

According to the above-mentioned technical solution, when the offload point device finds that the first air interface is unavailable, the offload point device may update the connection context information corresponding to the service(s) carried by the first air interface and inform the user equipment of the updated connection context information, such that the offload point device and the user equipment may reserve the same connection context information of the service(s) on the first air interface, thus data transmission may be successfully performed via the consistent connection context information. In this way, after the offload point device changes the connection context information on the first air interface, the offload point device and the user equipment still have the same connection context information so that data transmission may continue to be performed, thus the service(s) currently carried on the first air interface may be processed, all the service(s) of the UE in correspondence to the data transmission via the first air interface are prevented from being interrupted, and continuity of the service(s) of the UE is guaranteed as much as possible, thereby help improving communication experience of a user.

BRIEF DESCRIPTION OF DRAWINGS

In order to illustrate the technical solution in the embodiments of the present disclosure more clearly, a brief introduction on the accompanying drawings needed in the description of the embodiments is given below. Apparently, the accompanying drawings in the description below are merely some embodiments of the present disclosure, based on which other drawings may also be obtained by those of ordinary skill in the art without any inventive efforts.

DETAILED DESCRIPTION OF EMBODIMENTS

The technical solution in the embodiments of the present disclosure will be described clearly and fully below in conjunction with the drawings in the embodiments of the present disclosure. Evidently, the described embodiments are only a part, but not all, of the embodiments of the present disclosure. All other embodiments, which may be derived by the persons of ordinary skills in the art based on the embodiments of the present disclosure without any inventive efforts, fall into the protection scope of the present disclosure.

Figure 1:
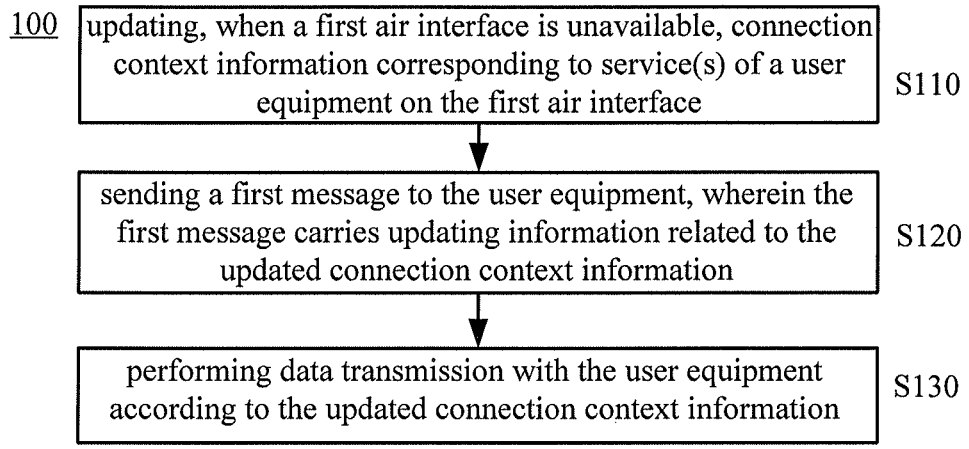
FIG. 1 is a flowchart of a method for data transmission according to an embodiment of the present disclosure.

First of all, a method 100 for data transmission according to the embodiment of the present disclosure is described in conjunction with FIG. 1.

As shown in FIG. 1, the method 100 includes the following steps: S110, updating, when a first air interface is unavailable, connection context information corresponding to service(s) of a user equipment on the first air interface, wherein the user equipment is connected to a core network through a first access network via the first air interface;

S120, sending a first message to the user equipment, wherein the first message carries updating information related to the updated connection context information, such that the user equipment updates connection context information currently corresponding to the service(s) on the first air interface according to the updating information so as to obtain the updated connection context information; and S130, performing data transmission with the user equipment according to the updated connection context information.

For example, the method 100 may be executed by an offload point device. When UE sends uplink data via a second air interface and the first air interface, the uplink data is converged to the offload point device via the second air interface and the first air interface. When a packet data network sends downlink data to the UE, offload of the downlink data is realized at the offload point device, and the offload point device sends one part of data to the UE via the second air interface and the other part of the data to the UE via the first air interface.

Figure 2:
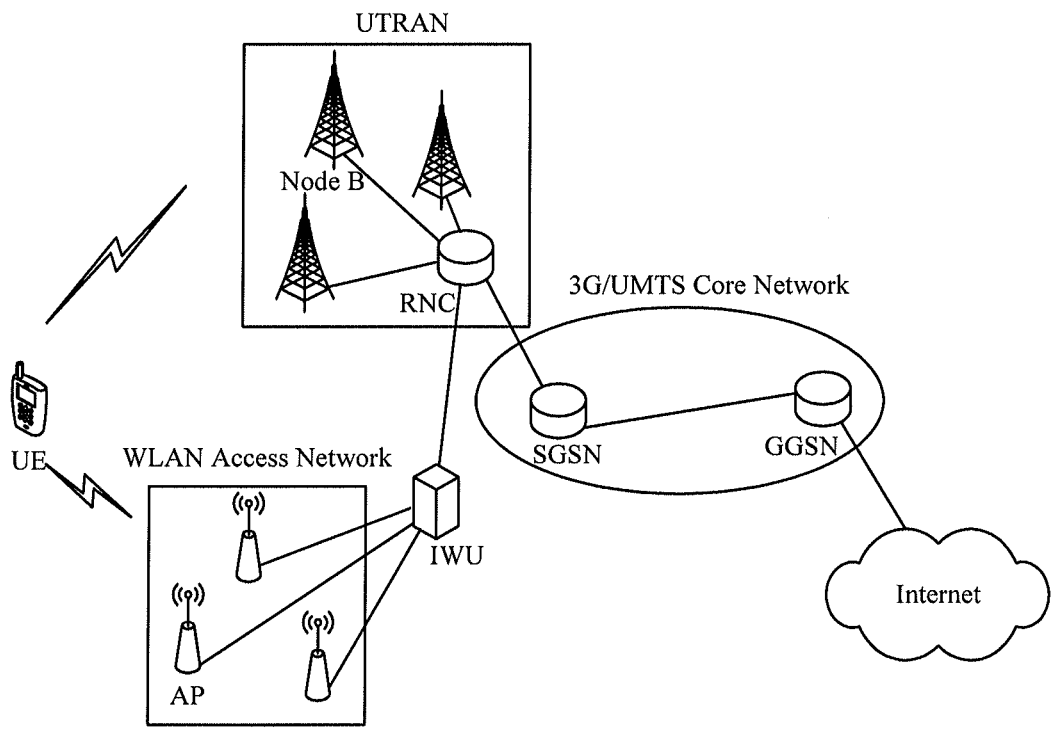
FIG. 2 is an example of network architecture for data offloading in a tight coupling manner.

In an example of a network architecture shown in FIG. 2, a radio network controller (Radio Network Controller, RNC) is an offload point device.

As shown in FIG. 2, the UE may access to a 3G/UMTS core network through a UTRAN (UMTS Terrestrial Radio Access Network, UMTS terrestrial radio access network) including a Node B (Node B) and an RNC, or access to 3G/UMTS core network through a WLAN access network including an access point (Access Point, AP), wherein an IWU (Interworking Unit, interworking unit) is used for connecting the AP to the RNC. The 3G/UMTS core network includes an SGSN (Serving GPRS Support Node, serving GPRS support node) and a GGSN (Gateway GPRS Support Node, gateway GPRS support node). By accessing to the 3G/UMTS core network, the UE may further access to the internet so as to receive a packet data service. Data transmitted from the UE to the internet, no matter over a UMTS air interface provided by the UTRAN or over a WiFi (Wireless Fidelity, wireless fidelity) air interface provided by the WLAN, reaches the RNC anyway, and the RNC transmits the data to the 3G/UMTS core network, such that the data is enabled to get to the internet. Data transmitted from the internet to the UE all goes through the 3G/UMTS core network to reaches the RNC, and the RNC performs offloading to the data, which may be transmitted to the UE via the UMTS air interface, via the WiFi air interface, or via the UMTS air interface and the WiFi air interface simultaneously. It can thus be seen that, under the network architecture, the offload point device is the RNC.

Besides the example shown in FIG. 2, the offload point device may also be an SGSN, a GGSN, a PDN-GW (Packet Data Network-Gateway, packet data network gateway), an S-GW (Serving-Gateway, serving-gateway), a base station integrated with multiple access modes or the like. The present disclosure does not set limitation to the specific form of the offload point device.

In S110, when the offload point device finds that the first air interface is unavailable, since the offload point device stores correspondence relationship between the service(s) carried on the first air interface and the connection context information, the offload point device may process a data transmission on the first air interface by updating the connection context information corresponding to the service(s) on the first air interface.

The "the first air interface is unavailable" means that, for a certain user equipment, although the user equipment may originally transmit data via the first air interface, however, due to occurrence of some network breakdown or network congestion and the like, the user equipment cannot use the first air interface to transmit data any more, thus the first air interface is unavailable for the user equipment. The "the first air interface is unavailable" may refers to that, uplink of the first air interface is unavailable, downlink of the first air interface is unavailable, or both uplink and downlink of the first air interface are unavailable.

The connection context information corresponding to a service is used for representing connection information involved in accepting serving of the service by the UE. Resources that are used for transmitting data of the service may be determined with reference to the connection context information, thus a transmission path of the service may be determined. Change of the connection context information means change of the transmission path of the service. For example, connection context may include, but is not limited to, at least one of a radio access bearer identification (Radio Access Bearer Identification, RAB ID) and a packet data network internet protocol (Packet Data Network Internet Protocol, PDN-IP) address, wherein radio resources allocated to the UE by an access network side may be uniquely determined through the RAB ID, and resources occupied by a core network side for routing service data may be determined through the PDN-IP address.

According to the embodiment of the present disclosure, in the scenario of Multi-RAT, the UE accesses to the core network via the second air interface and the first air interface simultaneously. The second air interface may be an air interface providing a reliable radio connection, and the UE may always reside on the second air interface and perform transmission on the second air interface. Radio access technology corresponding to the second air interface may be referred to as a primary RAT. No limitation is set on whether the first air interface may provide a reliable radio connection, and radio access technology corresponding to the first air interface may be referred to as a secondary RAT. The Multi-RAT does not guarantee reliability of a link between the secondary RAT and the UE. A possible reason for the reliability of the link between the secondary RAT and the UE not being guaranteed in data transmission is that the secondary RAT per se lacks of necessary reliability guarantee for a data transmission link, such as, for example, a WiFi air interface provided by the WLAN; or that, when the Multi-RAT is designed, since there is reliability guarantee for a data link provided by the primary RAT, the reliability guarantee for the data link originally present in the secondary RAT is weakened in the design, for example, signaling for guaranteeing the reliability is discarded through a signaling clipping method.

The offload point device may process the first air interface which has a problem by updating the connection context information corresponding to a service interacting with the UE on the first air interface, thereby avoiding a problem that all the services can only be interrupted in the absence of a processing mechanism in the prior art, and guaranteeing continuity of serving the UE as much as possible.

Figure 3:
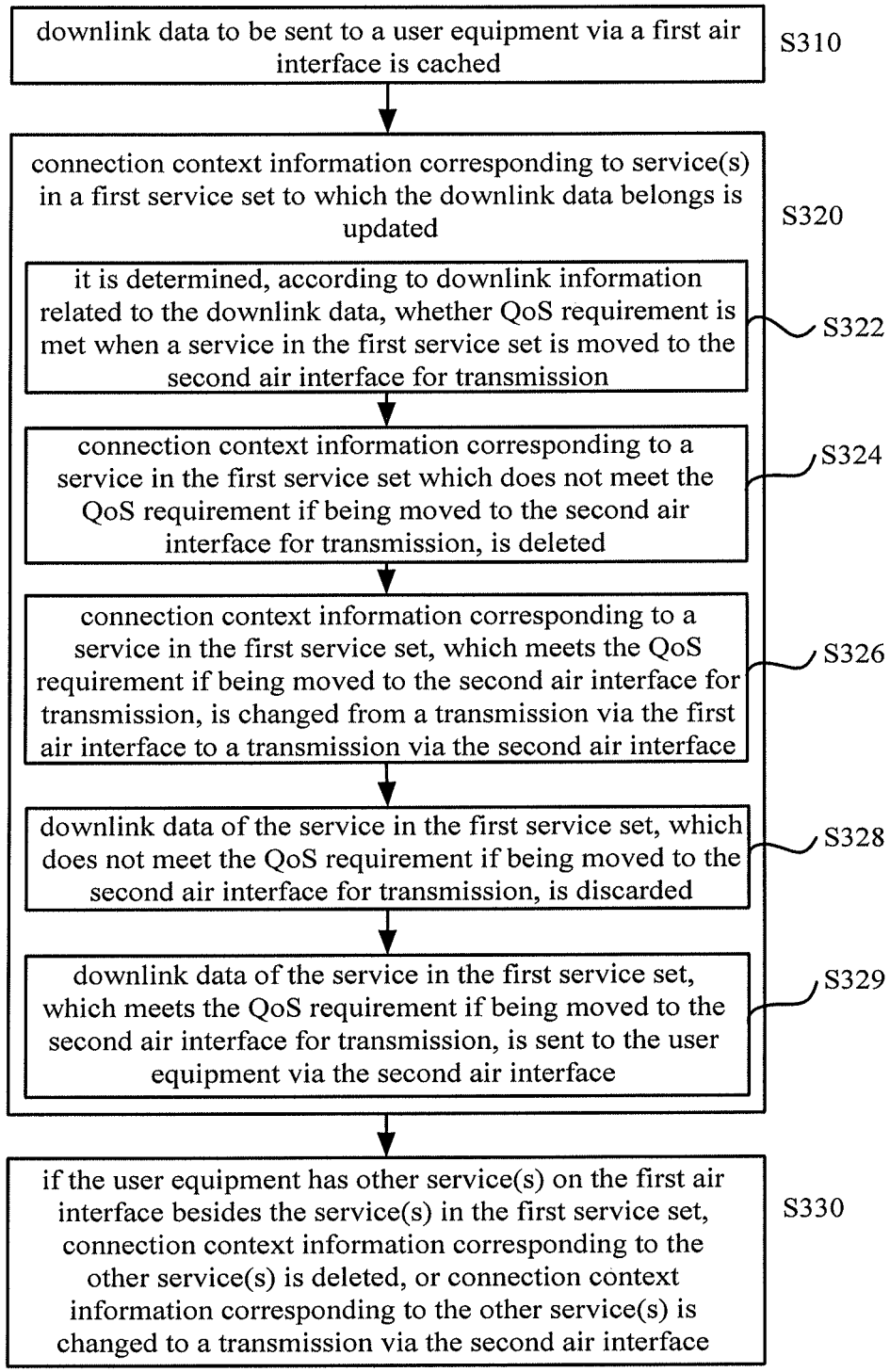
FIG. 3 is a flowchart of a method for updating connection context information according to the embodiment of the present disclosure.

According to an embodiment of the present disclosure, the connection context information involved in the first air interface may be updated by using a method 300 as shown in FIG. 3.

In S310, downlink data to be sent to a user equipment via a first air interface is cached.

When the offload point device finds that the first air interface is unavailable, the offload point device caches downlink data currently to be sent to the UE via the first air interface. When the downlink data is cached, the data may be restored to an original IP data packet, and the IP data packet is pushed to a temporary cache.

In S320, connection context information corresponding to service(s) in a first service set to which the downlink data belongs is updated.

The downlink data cached by the offload point device may belong to different services. A set constituted by service(s) to which the downlink data belongs is referred to as the first service set, and the service set includes at least one service.

The offload point device may update the connection context information corresponding to the service(s) in the first service set by adopting a procedure of S322-S326.

In S322, it is determined, according to downlink information related to the downlink data, whether quality of service (Quality of Service, QoS) requirement is met when a service in the first service set is moved to the second air interface for transmission.

The downlink information related to the downlink data cached in S310 may help the offload point device to determine whether the service(s) to which the downlink data belongs can be moved onto the second air interface for transmission. The downlink information may be determined during the process of caching the downlink data by the offload point device. For example, the downlink information may include, but is not limited to, at least one of the following items: an amount of time spent in caching the downlink data by the offload point device, service(s) to which the downlink data belongs, data volume of the downlink data, QoS required by the downlink data and the like.

Based on a hypothesis that the downlink data is moved to the second air interface, the offload point device may compare QoS achieved after the movement with the QoS required by the downlink data, so as to determine whether the QoS requirement is met if the downlink data is moved to the second air interface.

Service A is used for representing any service in the first service set. For example, if maximum latency required by the service A is exceeded when the downlink data of the service A is moved from the first air interface to the second air interface for transmission, the QoS requirement is not met if the downlink data is moved to the second air interface. A possible reason for the maximum latency being exceeded is that the offload point device finds an excessively large latency caused by the unavailable first air interface, or that an latency from caching the downlink data to starting to processing the downlink data of the service A is excessively large, or that a processing latency caused by moving the downlink data of the service A from the first air interface to the second air interface is excessively large, etc.

For another example, if throughput required by the service A cannot be reached when the downlink data of the service A is moved from the first air interface to the second air interface for transmission, the QoS requirement is not met if the service A is moved to the second air interface for transmission. The required throughput cannot be reached probably due to limited radio resources of the second air interface or limitation on the manner of data transmission of the second air interface.

If the QoS requirement of the service A may be met when the downlink data of the service A is moved to the second air interface for transmission, it is determined that the QoS requirement is met.

In S324, connection context information corresponding to a service in the first service set which does not meet the QoS requirement if being moved to the second air interface for transmission, is deleted.

A service in the first service set is originally transmitted on the first air interface. Since the first air interface is unavailable right now, it is required to move the service(s) in the first service set to the second air interface for transmission. However, if the QoS requirement cannot be met in case of the movement, data transmission of a service which does not meet the QoS requirement in case of the movement is interrupted, and thus the connection context information corresponding to the service is deleted.

In S326, connection context information corresponding to a service in the first service set, which meets the QoS requirement if being moved to the second air interface for transmission, is changed from a transmission via the first air interface to a transmission via the second air interface.

If the QoS requirement can be met in case of the movement, it is not required to interrupt the transmission of data of the service. At this moment, the data of the service may be transmitted via the second air interface, thus the connection context information corresponding to the service may be modified to a form of a transmission via the second air interface.

Although S326 is executed after S324, S326 may also be executed before S324 or executed simultaneously with S324. Execution sequence of S326 and S324 does not limit the protection scope of the present disclosure.

After the connection context information of the service(s) corresponding to the downlink data is updated, the cached downlink data may further be processed according to the update result.

In S328, downlink data of the service in the first service set, which does not meet the QoS requirement if being moved to the second air interface for transmission, is discarded.

In S329, downlink data of the service in the first service set, which meets the QoS requirement if being moved to the second air interface for transmission, is sent to the user equipment via the second air interface.

For example, when the offload point device finds that the first air interface is unavailable, the offload point device caches the downlink data and determines that the downlink data belongs to services A, B and C respectively. If maximum latencies required by the services A and C cannot be met if the transmissions of the services A and C are moved to the second air interface, and QoS required by the service B may be met if the transmission of the service B is moved to the second air interface, the offload point device deletes the connection context information corresponding to the services A and C and discards the cached downlink data of the services A and C, meanwhile, the offload point device changes the connection context information corresponding to the service B from a transmission via the first air interface to a transmission via the second air interface, and sends the cached downlink data of the service B to the UE via the second air interface.

Moreover, besides the service(s) corresponding to the cached downlink data, there may be other service(s) on the first air interface interacted between the UE and a network. In order to efficiently solve all the services on the first air interface, the method 300 may further include S330.

In S330, if the user equipment has other service(s) on the first air interface besides the service(s) in the first service set, connection context information corresponding to the other service(s) is deleted, or connection context information corresponding to the other service(s) is changed to a transmission via the second air interface.

If the connection context information of a service originally transmitted on the first air interface is not processed according to S310 and S320, the connection context information may be deleted or changed to indicating a transmission via the second air interface according to presetting, so that correspondence relationship between services and connection context information stored by the offload point device does not include the service(s) transmitted via the first air interface any more, thus the service(s) on the unavailable first air interface is processed efficiently, and all the services on the first air interface are prevented from being interrupted as much as possible. Moreover, the offload point device determines how to process the connection context information according to the quality of service requirement, consequently, the service(s) on the first air interface may be efficiently processed and continuity of the service is maintained as much as possible without producing adverse effects on the quality of service of the service, thereby utilizing network resources more efficiently, and preventing the network resources from being wasted in transmitting the services which cannot meet the quality of service requirement.

Figure 4:
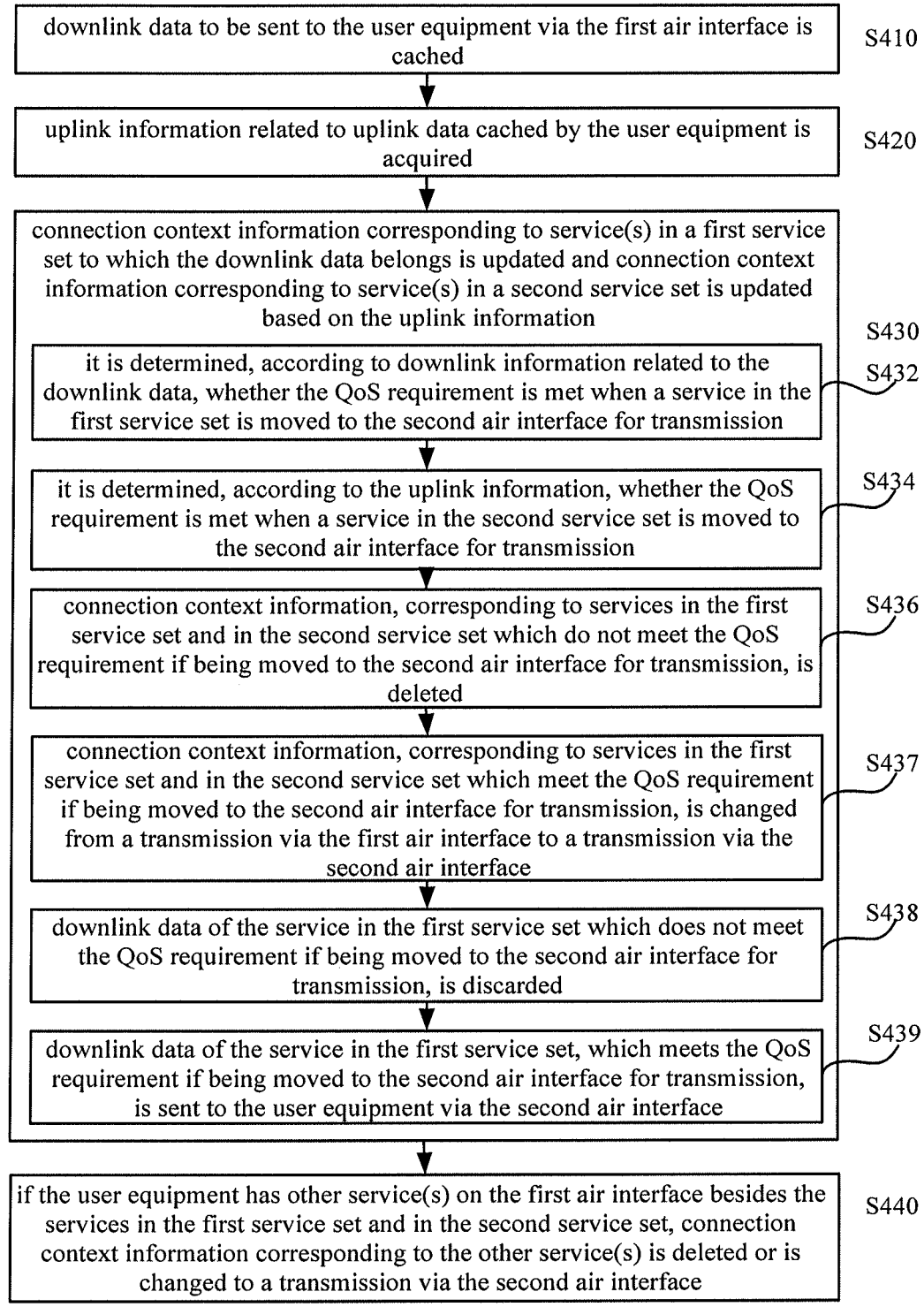
FIG. 4 is a flowchart of another method for updating connection context information according to the embodiment of the present disclosure.

According to an embodiment of the present disclosure, the connection context information involved in the first air interface may also be updated by adopting a method 400 as shown in FIG. 4.

In S410, downlink data to be sent to the user equipment via the first air interface is cached. This step is the same as S310.

In S420, uplink information related to uplink data cached by the user equipment is acquired.

When the user equipment finds that the first air interface is unavailable, the user equipment may cache the uplink data to be sent to a network side via the first air interface. When the UE caches the uplink data, the UE may restore data packets which have been packaged into a form of being sent via the first air interface to original IP data packets and push the IP data packets to a temporary cache. If the UE still reserves the original IP data packets and is ready to package the original IP data packets in the form of being sent via the first air interface, the UE directly pushes these original IP data packets to the temporary cache. If the UE generates new data to be sent via the first air interface, the processing is stopped.

After the user equipment caches the uplink data, the user equipment may inform the offload point device of the uplink information related to the uplink data. The uplink information may assist the offload point device in judging whether service(s) to which the uplink data belongs can be moved to the second air interface for transmission. The uplink information related to the uplink data may include, but is not limited to, at least one of the following items: an amount of time spent in caching the uplink data by the user equipment, service(s) to which the uplink data belongs, data volume of the uplink data, connection context information corresponding to the service(s) to which the uplink data belongs, and a determination result of whether the service(s) to which the uplink data belongs may be moved to the second air interface for transmission that is determined by the UE.

In S430, connection context information corresponding to service(s) in a first service set to which the downlink data belongs is updated and connection context information corresponding to service(s) in a second service set is updated based on the uplink information.

After acquiring the uplink information, the offload point device may determine the service(s) to which the uplink data cached by the UE belongs with reference to the uplink information. The uplink data cached by the UE may belong to different services. A set constituted by the service(s) to which the uplink data belongs is referred to as the second service set, and the second service set includes at least one service. As described in S320, a set constituted by the service(s) to which the downlink data belongs is referred to as the first service set, and the first service set includes at least one service. The first service set and the second service set probably have an intersection or probably are not overlapped at all. A union set of the first service set and the second service set probably includes all services interacted between the offload point device and the UE via the first air interface, or probably is a subset of all the services interacted between the offload point device and the UE.

After determining the first service set and the second service set, the offload point device may update the corresponding connection context information, so that the services in the first service set and in the second service set originally transmitted on the first air interface are not transmitted via the first air interface any more. According to the embodiment of the present disclosure, the offload point device may determine whether a service may be moved to the second air interface for transmission with reference to QoS requirement of the service. For example, the offload point device may update the connection context information corresponding to the services in the first service set and in the second service set in a manner of S432 to S437.

In S432, it is determined, according to downlink information related to the downlink data, whether the QoS requirement is met when a service in the first service set is moved to the second air interface for transmission. This step is the same as S322.

In S434, it is determined, according to the uplink information, whether the QoS requirement is met when a service in the second service set is moved to the second air interface for transmission.

Service B is used for representing any service in the second service set. After the UE uploads uplink information of the service B to the offload point device, the offload point device may determine whether the QoS requirement is met if the service B is moved to the second air interface for transmission according to the uplink information.

For example, according to the uplink information, the offload point device may determine that the UE caches uplink data of the service B and determine the time spent on the caching process. The offload point device takes the sum of this amount of time and an amount of time to be spent in moving the service B as latency introduced by sending the service B via the second air interface. If the latency exceeds a maximum latency required by the service B, the QoS requirement is not met when the service B is moved to the second air interface for transmission. For example, according to the uplink information, the offload point device determines that 2 seconds are spent in caching the uplink data of the service B, and if another 1 second would be spent in moving the service B to the second air interface for transmission, the offload point device determines, when the QoS requirement of the service B is 2 seconds, that the QoS requirement is not met if the service B is moved to the second air interface for transmission; and the offload point device determines, when the QoS requirement of the service B is 5 seconds, that the QoS requirement is met if the service B is moved to the second air interface for transmission.

For another example, according to the uplink information, the offload point device may determine that the UE caches uplink data of the service B and determine data volume of the uplink data of the service B. Through the data volume, the offload point device may calculate bandwidth to be allocated if the uplink data is sent via the second air interface within a predefined period of time. When the bandwidth calculated by the offload point device is smaller than throughput required by the service B, the offload point device determines that the QoS requirement is not met if the service B is moved to the second air interface for transmission; and when the bandwidth calculated by the offload point device is bigger than the throughput required by the service B, the offload point device determines that the QoS requirement is met if the service B is moved to the second air interface for transmission.

In S436, connection context information, corresponding to services in the first service set and in the second service set which do not meet the QoS requirement if being moved to the second air interface for transmission, is deleted.

In S437, connection context information, corresponding to services in the first service set and in the second service set which meet the QoS requirement if being moved to the second air interface for transmission, is changed from a transmission via the first air interface to a transmission via the second air interface.

By executing S436 and S437, the following results may be realized: if a service belongs to both the first service set and the second service set, then only when it is determined in both S432 and S434 that the QoS requirement is met if the service is moved to the second air interface for transmission, connection context information corresponding to the service is changed from indicating a transmission via the first air interface to indicating a transmission via the second air interface; otherwise, the connection context information corresponding to the service is deleted. If a service belongs to one of the first service set and the second service set, whether the connection context information is deleted or changed may be determined according to the determination result in S432 or S434.

Although S434 is executed after S432, there is no limitation on execution sequence of S434 and S432, as long as S434 and S432 both are executed before S436 and S437. Although S437 is executed after S436, no limitation is set on execution sequence of S437 and S436, as long as S436 and S437 both are executed after S434 and S432.

By determining how to update the connection context information of services corresponding to the downlink data cached by the offload point device and to the uplink data cached by the UE according to the QoS requirement, a service on the first air interface may be efficiently processed, and continuity of the service is maintained as much as possible without producing adverse effects on the quality of service of the service, thereby utilizing network resources more efficiently, and preventing the network resources from being wasted in transmitting a service which does not meet the QoS requirement.

After the connection context information of the services corresponding to the downlink data and to the uplink data is updated, the offload point device may further process the cached downlink data according to the update result.

In S438, downlink data of the service in the first service set which does not meet the QoS requirement if being moved to the second air interface for transmission, is discarded.

In S439, downlink data of the service in the first service set, which meets the QoS requirement if being moved to the second air interface for transmission, is sent to the user equipment via the second air interface.

For example, when the offload point device finds that the first air interface is unavailable, the offload point device caches downlink data and determines that the downlink data belongs to services A, B and C respectively. The offload point device acquires uplink information from the UE, and determines that the UE cached services A, C and D. The offload point device determines, according to an amount of time spent on the process of caching the downlink data and the like, that maximum latency required by the service A, namely QoS requirement of the service A, cannot be met if the service A is moved to the second air interface for transmission, and that QoS requirement of the service B and that of the service C may be met if the service B and the service C are moved to the second air interface for transmission. Moreover, the offload point device determines, according to an amount of time spent by the UE in caching the uplink data indicated by uplink information reported by the UE and the like, that QoS requirements of the services A and D may be met if the service A and the service D are moved to the second air interface for transmission, and the maximum latency required by the service C cannot be met if the service C is moved to the second air interface for transmission. Therefore, the offload point device deletes connection context information corresponding to the service A and the service C respectively, and changes connection context information corresponding to the service B and the service D respectively from indicating a transmission via the first air interface to indicating a transmission via the second air interface. Moreover, the offload point device discards the cached downlink data of the service A and of the service C, and sends the cached downlink data of the service B to the UE via the second air interface.

Moreover, besides the service(s) corresponding to the downlink data cached by the offload point device and the service(s) corresponding to the uplink data cached by the UE, there may be other service(s) on the first air interface interacted between the UE and the network. In order to efficiently solve all the services on the first air interface, the method 400 may further include S440.

In S440, if the user equipment has other service(s) on the first air interface besides the services in the first service set and in the second service set, connection context information corresponding to the other service(s) is deleted or is changed to a transmission via the second air interface.

For a service originally transmitted on the first air interface, if its connection context information is not processed, according to a presetting, the connection context information may be deleted or changed to indicating a transmission via the second air interface, so that correspondence relationship between services and connection context information stored by the offload point device does not include the service(s) transmitted via the first air interface any more, thus the service(s) on the unavailable first air interface is processed efficiently, and all the services on the first air interface are prevented from being interrupted as much as possible.

By determining whether a service is moved to the second air interface according to the QoS requirement of the service, a service which meets the QoS requirement if being moved to the second air interface for transmission may further be served, thus the continuity of the service may be guaranteed; and a service which does not meet the QoS requirement if being moved to the second air interface for transmission is interrupted to be served, thereby eliminating waste of resources that is caused by allocating resources of the second air interface to a service which does not meet the QoS requirement.

Referring back to FIG. 1, in S120, after the offload point device updates the connection context information on the first air interface, the offload point device needs to send the first message to the UE to inform the UE of the updated connection context information, so that the UE may reserve the same connection context information as that reserved by the offload point device.

The updating information carried in the first message may be the updated connection context information per se, for example, a value of the updated connection context information is directly carried in the first message. The updating information may also be an input parameter required for deriving the connection context information, for example, a variation of the connection context information is carried in the first message, and the UE may derive the updated connection context information via the variation.

In S130, after the offload point device sends the first message to the UE, the offload point device may perform data transmission with the UE according to the updated connection context information.

According to an embodiment of the present disclosure, if a response, that connection context information currently corresponding to the first air interface is successfully updated, returned by the UE is received, then data transmission is performed with the UE according to the updated connection context information. As the offload point device receives the response indicating successful update, the offload point device may determine that the UE has successfully updated the connection context information. At this moment, connection context information of the UE is in accordance with that of the offload point device, thus performing data transmission according to the updated connection context information may ensure success of the data transmission.

According to the method for data transmission provided by the embodiment of the present disclosure, when the offload point device finds that the first air interface is unavailable, the offload point device may update the connection context information corresponding to the service(s) carried on the first air interface and inform the user equipment of the updated connection context information, in this way, the offload point device and the user equipment may continue to perform data transmission based on the same connection context information, thus the service(s) currently carried on the first air interface may be processed, all the service(s) of the UE in correspondence to the data transmission via the first air interface are prevented from being interrupted, and continuity of the service(s) of the UE is guaranteed as much as possible, thereby help improving communication experience of a user.

Figure 5:
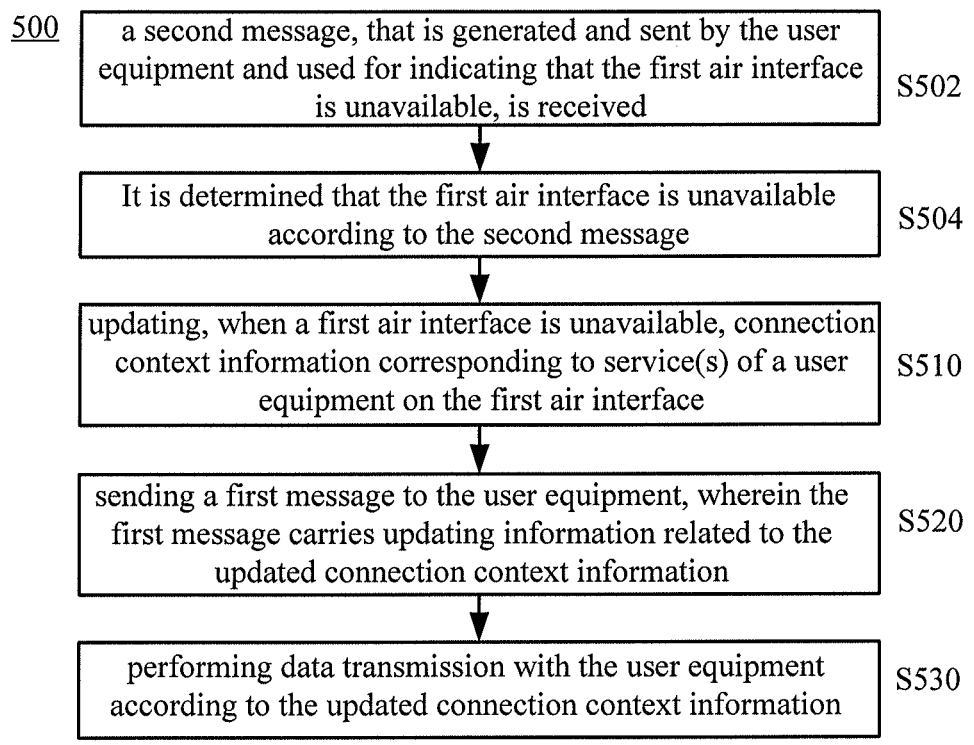
FIG. 5 is a flowchart of another method for data transmission according to the embodiment of the present disclosure.

The following describes a flowchart of a method 500 for data transmission according to an embodiment of the present disclosure by referring to FIG. 5. Through S502 and S504 in the method 500, the offload point device may determine that the first air interface is unavailable.

In S502, a second message, that is generated and sent by the user equipment and used for indicating that the first air interface is unavailable, is received.

According to the embodiment of the present disclosure, the second message indicating that the first air interface is unavailable, that is generated and sent by the user equipment under one of the following situations, may be received: when a number of times a data packet is resent to an access device of the first air interface exceeds a predefined number of times, or when an amount of time in resending a data packet to an access device exceeds a first predefined period of time, or when a response that is returned by the access device and used for responding to a data packet sent by the user equipment is not received within a second predefined period of time.

It is described by taking that the UE finds that a WiFi air interface is unavailable as an example, but the present disclosure is not limited to that the WiFi air interface is unavailable. Other unreliable air interface or air interface of which reliability functionality is weakened may also be unavailable.

When the UE sends uplink data via a WiFi link and a size of sent data packet is bigger than a certain threshold, RTS (Request to Send, request to send)/CTS (Clear to Send, clear to send) mechanism may be activated. In the RTS/CTS mechanism, the UE may send an RTS message to an access point (Access Point, AP) at first. If the UE receives a CTS message returned by the AP, the UE may start to send the data packet. If the AP successfully decodes the received data packet, the AP returns an acknowledge (Acknowledge, ACK) message to the UE, wherein the AP is an access device of the WiFi air interface.

When the UE sends the RTS message to the AP, if the UE does not receive the CTS message within the second predefined period of time due to network congestion or other reason, the UE determines that WiFi uplink is unavailable, thus the WiFi air interface is unavailable. The UE probably resends the RTS message to the AP for a plurality of times within the second predefined period of time.

When the UE receives the CTS message and starts to send the data packet, if the UE does not receive the ACK message returned by the AP, the UE retransmits the data packet until receiving the ACK message returned by the AP. However, if a number of times the UE retransmits the data packet exceeds a predefined number of times, such as, for example, 7 times, the UE determines that the WiFi uplink is unavailable, thus the WiFi air interface is unavailable.

When the UE receives the CTS message and starts to send the data packet, if an amount of time in which the UE retransmits the data packets exceeds a first predefined period of time, while an ACK message returned by the AP has not been received yet, the UE determines that the WiFi uplink is unavailable, thus the WiFi air interface is unavailable.

Moreover, when the UE sends the uplink data via the WiFi link, the UE may also directly send a data packet to the AP. After the UE sends a data packet to the AP, if the UE does not receive an ACK message returned by the AP, the UE resends the data packet until receiving the ACK message returned by the AP. However, if a number of times the UE resends the data packet to the AP exceeds a predefined number of times while a response returned by the AP has not been received yet, the UE determines that the WiFi uplink is unavailable. If an amount of time in which the UE resends the data packet exceeds a first predefined period of time while a response returned by the AP has not been received yet within the first predefined period of time, the UE determines that the WiFi uplink is unavailable. If the UE does not receive a response returned by the AP within a second predefined period of time after the UE sends a data packet to the AP, the UE determines that the WiFi uplink is unavailable.

In addition, according to an embodiment of the present disclosure, the user equipment may periodically generate and send a data packet for detecting availability of the first air interface to an access device of the first air interface. Specifically, in the example of the WiFi air interface, when the UE does not have uplink data to be sent, the UE may periodically generate and send a data packet for detecting availability of the WiFi air interface to the AP. As the data packet does not need to carry uplink data, the data packet for detecting the availability of the WiFi air interface is briefly referred to as a small data packet hereinafter. The UE determines whether the WiFi uplink is available or not by periodically generating a small data packet. The small data packet may be randomly generated. The small data packet is used for detecting the availability of the WiFi link and has nothing to do with data transmission.

For example, if a small data packet needs to be interacted through RTS/CTS, when the UE is ready to send the small data packet to the AP, the UE sends a RTS message to the AP and then sends the small data packet after receiving a CTS message. Of course, the small data packet may also be configured to be directly sent; and when the UE expects to detect the availability of the WiFi uplink, the UE directly sends the small data packet to the AP so as to see whether an ACK message returned by the AP may be received. A sending period of an RTS required for sending a small data packet or of a small data packet in case of direct sending may be relatively long, and in this way, the small data packet will not conflict with a resending mechanism of the WLAN. Moreover, as these randomly generated small data packets are not service data required to be sent by the UE, the UE does not need to cache any small data packet. When the UE needs to detect the availability of the first air interface, the UE directly generates a small data packet and sends the small data packet without caching it, thus storage space will not be wasted.

In a process of sending a small data packet by the UE, when a number of times the small data packet is resent to the AP exceeds a predefined number of times, or when an amount of time in resending the small data packet to the AP exceeds a first predefined period of time, or when a response that is returned by the AP and used for responding to the small data packet sent by the UE is not received within a second predefined period of time, the UE may determine that the WiFi uplink is unavailable, thus the WiFi air interface is unavailable According to another embodiment, in S502, a second message, which is generated and sent by the access device of the first air interface and is used for indicating that the first air interface is unavailable, is received.

According to the embodiment of the present disclosure, the second message indicating that the first air interface is unavailable, which is generated and sent by the access device of the first air interface under one of the following situations, may be received: when a number of times a data packet is resent to the user equipment exceeds a predefined number of times, or when an amount of time in resending a data packet to the user equipment exceeds a first predefined period of time, or when a response that is sent by the user equipment and used for responding to a data packet sent by the access device is not received within a second predefined period of time.

It is described by taking that the AP finds that the WiFi air interface is unavailable as an example, but the present disclosure is not limited to that the WiFi air interface is unavailable. Other unreliable air interface or air interface of which reliability functionality is weakened may also be unavailable.

When the AP sends downlink data via a WiFi link, in case of employing the RTS/CTS mechanism, the AP may firstly send an RTS message to the UE. If the AP receives a CTS message returned by the UE, the AP may start to send a data packet. If the UE successfully decodes the received data packet, the UE returns an ACK message to the AP.

When the AP sends an RTS message to the UE, if the AP does not receive a CTS message within a second predefined period time due to network congestion or other reason, the AP determines that WiFi downlink is unavailable, thus the WiFi air interface is unavailable. The AP probably resends the RTS message to the UE for a plurality of times within the second predefined period of time.

When the AP receives a CTS message and starts to send the data packet, if the AP does not receive an ACK message returned by the UE, the AP retransmits the data packet until receiving the ACK message returned by the UE. However, if a number of times the AP retransmits the data packet exceeds a predefined number of times, such as, for example, 7 times, the AP determines that the WiFi downlink is unavailable, thus the WiFi air interface is unavailable.

When the AP receives the CTS message and starts to send the data packet, if an amount of time in which the AP retransmits the data packet exceeds a first predefined period of time, while an ACK message returned by the UE has not been received yet, the AP determines that the WiFi downlink is unavailable, thus the WiFi air interface is unavailable.

Moreover, when the AP sends downlink data via the WiFi link, the AP may also directly send a data packet to the UE. After the AP sends a data packet to the UE, if the AP does not receive an ACK message returned by the UE, the AP resends the data packet until receiving the ACK message returned by the UE. However, if a number of times the AP resends the data packet to the UE exceeds a predefined number of times while a response returned by the UE has not yet been received, the AP determines that the WiFi downlink is unavailable. If an amount of time in which the AP resends the data packet exceeds a first predefined period of time and a response returned by the UE has not been received yet within the first predefined period of time, the AP determines that the WiFi uplink is unavailable. If the AP does not receive a response returned by the UE within a second predefined period of time after the AP sends a data packet to the UE, the AP determines that the WiFi downlink is unavailable.

In addition, according to an embodiment of the present disclosure, an access device of the first air interface may periodically generate and send a data packet for detecting availability of the first air interface to the user equipment. Specifically, in the example of the WiFi air interface, when the AP does not have downlink data required to be sent, the AP may periodically generate and send a data packet for detecting availability of the WiFi air interface to the UE. As the data packet does not need to carry downlink data, the data packet may also be briefly referred to as a small data packet. The AP determines whether the WiFi downlink is available by periodically generating a small data packet. The small data packet may be randomly generated. The small data packet is used for detecting the availability of the WiFi link and has nothing to do with data transmission.

For example, if a small data packet needs to be interacted through RTS/CTS, when the AP is ready to send the small data packet to the UE, the AP sends a RTS message to the UE and then sends the small data packet after receiving a CTS message. Certainly, the small data packet may also be configured to be directly sent, and when the AP expects to detect the availability of the WiFi downlink, the AP directly sends the small data packet to the UE so as to see whether an ACK message returned by the UE may be received. A sending period for an RTS required for sending a small data packet or for a small data packet in case of direct sending may be relatively long, and in this way, the small data packet will not conflict with a resending mechanism of the WLAN. Moreover, as these randomly generated small data packets are not service data required to be sent by the AP, the AP does not need to cache any small data packet. When the AP needs to detect the availability of the first air interface, the AP directly generates a small data packet and sends the small data packet without caching it, thus storage space will not be wasted.

In a process of sending a small data packet by the AP, when a number of times the small data packet is resent to the UE exceeds a predefined number of times, or when an amount of time in resending the small data packet to the UE exceeds a first predefined period of time, or when a response that is returned by the UE and used for responding to the small data packet sent by the AP is not received within a second predefined period of time, the AP may determine that the WiFi downlink is unavailable, thus the WiFi air interface is unavailable According to the embodiment of the present disclosure, the second message received in S502 may be application layer signaling, and by carrying a predefined identification in a header of a data packet, it is indicated that the data packet carries application layer signaling. By adopting a manner of the application layer signaling, an existing signaling structure may not be changed, thus easily introducing a message for indicating that the air interface is unavailable to an existing system, and being convenient to be realized.

In S504, It is determined that the first air interface is unavailable according to the second message.

After the offload point device receives the second message in S502, the offload point device may determine that the first air interface is unavailable.

S510, S520 and S530 are the same as S110, S120 and S130, which will not be described reluctantly herein for brevity.

Figure 7:
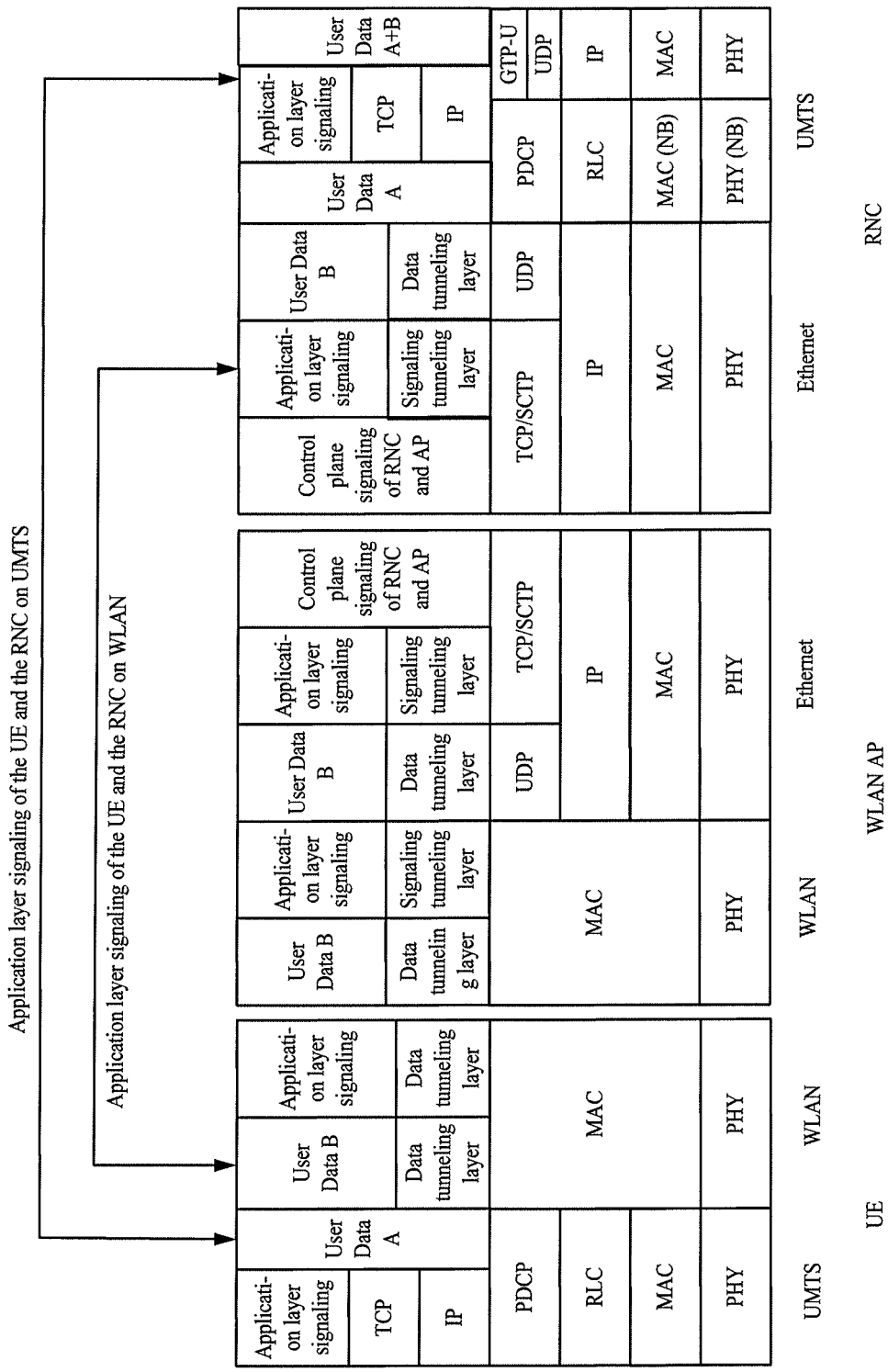
FIG. 7 is a second example of the protocol stack under the scenario of Multi-RAT.
Figure 8:
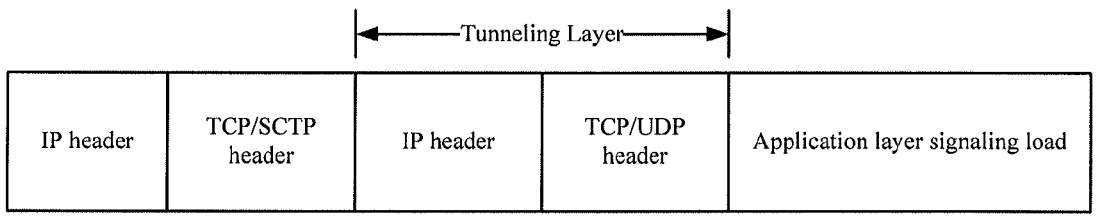
FIG. 8 is an example of an encapsulating format of application layer signaling between an access device of a first air interface and an offload point device in the first example and the second example.
Figure 9:
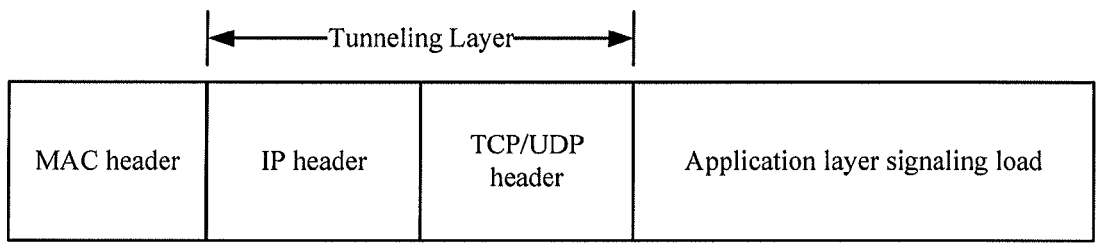
FIG. 9 is an example of an encapsulating format of application layer signaling between the access device of the first air interface and a user equipment in the first example and the second example.

The application layer signaling for indicating that the first air interface is unavailable may in forms as shown in FIG. 8 and FIG. 9. Besides indicating that the first air interface is unavailable, the application layer signaling may also deliver other information. In FIG. 8 and FIG. 9, the application layer signaling is encapsulated in a data packet, and a predefined identification is set at the header of the data packet for showing that the data packet carries application layer signaling. The predefined identity may be any character or character string agreed by sending party and receiving party, and the character or character string will not conflict with an existing standard. For example, in FIG. 8 and FIG. 9, by carrying a predefined IP address at a header of a data packet, it is illustrated that the data packet carries application layer signaling. Before describing an encapsulation form, a protocol stack under the Multi-RAT is described by referring to FIG. 6 and FIG. 7, so as for the encapsulation form to be better understood.

Figure 6:
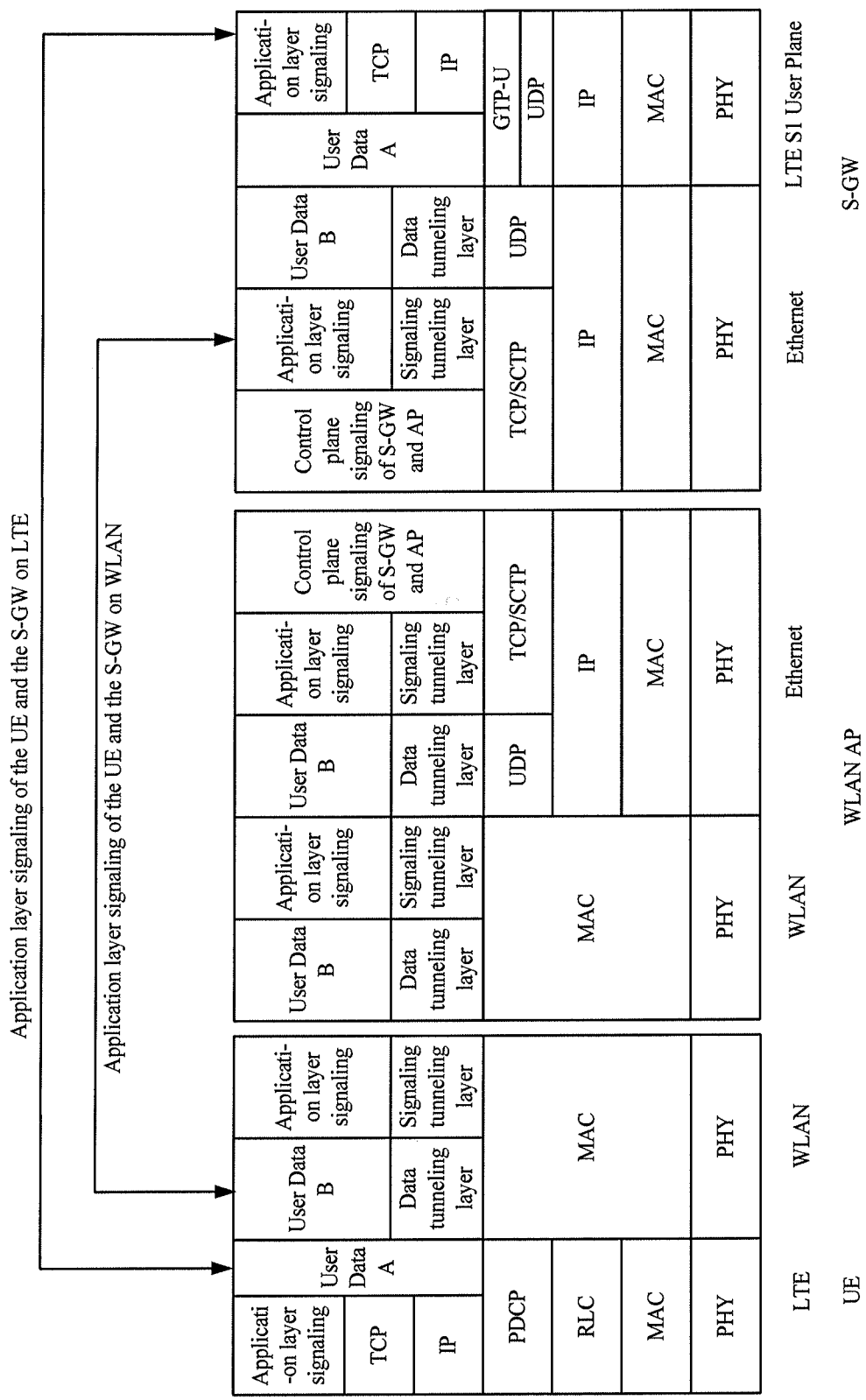
FIG. 6 is a first example of a protocol stack under a scenario of Multi-RAT.

In a first example of the protocol stack as shown in FIG. 6, a primary RAT is an access technology of LTE, and a secondary RAT is an access technology of WLAN. Hence, the second air interface is an LTE air interface, and the first air interface is a WiFi air interface.

The UE has an LTE protocol stack and a WLAN protocol stack. The WLAN protocol stack of the UE is equivalent to that of the AP. An Ethernet protocol stack of the AP is equivalent to that of the offload point device, i.e., S-GW. The LTE protocol stack of the UE may communicate with the protocol stack of an LTE S1 user plane of the S-GW through protocol stack conversion in a base station.

In a second example of the protocol stack as shown in FIG. 7, the primary RAT is an access technology of UMTS, and the secondary RAT is the access technology of WLAN. Therefore, the second air interface is a UMTS air interface, and the first air interface is a WiFi air interface.

The UE has a UMTS protocol stack and a WLAN protocol stack. The WLAN protocol stack of the UE is equivalent to that of the AP. An Ethernet protocol stack of the AP is equivalent to that of an offload point device, i.e. RNC. The UMTS protocol stack of the UE may communicate with the UMTS protocol stack of the RNC through protocol stack conversion in a base station.

It can be seen from FIG. 6 and FIG. 7 that, when the WiFi air interface is unavailable, the UE may inform the offload point device that the WiFi air interface is unavailable by employing application layer signaling in the LTE protocol stack or in the UMTS protocol stack.

An encapsulation format of FIG. 8 shows a format of a UE-related application layer signaling data packet delivered between the AP and the offload point device, i.e., RNC/S-GW.

As shown in FIG. 8, an application layer signaling data packet between the AP and the offload point device, i.e., RNC/S-GW includes an IP header, a TCP (Transmission Control Protocol, transmission control protocol)/SCTP (Stream Control Transmission Protocol, stream control transmission protocol) header, a tunneling layer header and an application layer signaling load, wherein the tunneling layer header includes an IP header and a TCP/UDP (User Datagram Protocol, user datagram protocol) header, and information that the first air interface is unavailable is carried in the application layer signaling load.

When the AP sends application layer signaling to the offload point device, in the IP header, a source IP address field carries an IP address of the AP, and a destination IP address field carries an IP address of the offload point device, i.e., RNC/S-GW. In the TCP/SCTP header, UEs are distinguished through a source port field. In an IP header of the tunneling layer, a source IP address field carries an IP address of the UE, and a destination IP address field carries a predefined IP address, wherein the predefined IP address represents that the data packet carries application layer signaling.

When the AP receives application layer signaling from the offload point device, in the IP header, the source IP address field carries the IP address of the offload point device, i.e., RNC/S-GW, and the destination IP address field carries the IP address of the AP. In the TCP/SCTP header, UEs are distinguished through a destination port. In the IP header of the tunneling layer, the source IP address field carries the predefined IP address, wherein the predefined IP address indicates that the data packet carries application layer signaling, and the destination IP address field carries the IP address of the UE.

An encapsulation format of FIG. 9 shows a format of a UE-related application layer signaling data packet delivered between the AP and the UE.

As shown in FIG. 9, an application layer signaling data packet between the AP and the UE includes a MAC header, a tunneling layer header and an application layer signaling load, wherein the tunneling layer header includes an IP header and a TCP/UDP header, and information that the first air interface is unavailable is carried in the application layer signaling load.

When the AP sends application layer signaling to the UE, in the MAC header, a source MAC address field carries a MAC address of the AP, and a destination MAC address field carries a MAC address of the UE. In the IP header of the tunneling layer, a source IP address field carries a predefined IP address for indicating that the data packet carries application layer signaling, and a destination IP address field carries an IP address of the UE.

When the AP receives application layer signaling from the UE, in the MAC header, the source IP address field carries the MAC address of the UE, and the destination IP address field carries the MAC address of the AP. In the IP header of the tunneling layer, the source IP address field carries the IP address of the UE, and the destination IP address field carries the predefined IP address for indicating that the data packet carries application layer signaling.

The application layer signaling not only may be used for indicating that the first air interface is unavailable, but also may be used for delivering other control information. By employing the application layer signaling, an existing signaling structure is not affected, and the method is convenient to be realized, thereby improving extensibility of the system.

The method for data transmission according to the embodiment of the present disclosure is described above from the network side. A method 1000 and a method 1100 for data transmission according to the embodiment of the present disclosure are described hereinafter from a user side.

Figure 10:
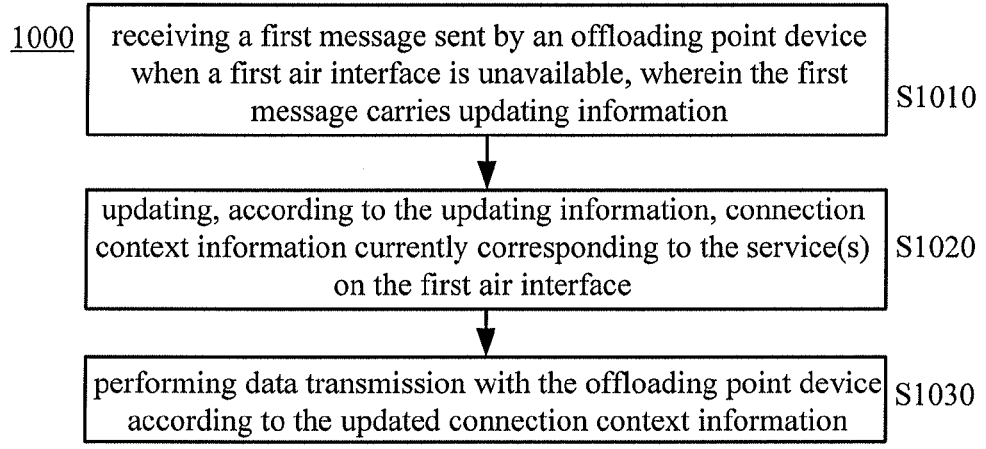
FIG. 10 is a flowchart of yet another method for data transmission according to the embodiment of the present disclosure.

As shown in FIG. 10, the method 1000 includes the following steps:

S1010, receiving a first message sent by an offloading point device when a first air interface is unavailable, wherein the first message carries updating information related to connection context information corresponding to service(s) of the user equipment on the first air interface that is updated by the offloading point device when the first air interface is unavailable, and the user equipment is connected to a core network through a first access network via the first air interface;

S1020, updating, according to the updating information, connection context information currently corresponding to the service(s) on the first air interface; and S1030, performing data transmission with the offloading point device according to the updated connection context information.

For example, the method 1000 may be executed by the user equipment. The UE is connected to the core network simultaneously through a second air interface and the first air interface, and the offload point device provides data offloading transmission for the UE. When the first air interface is unavailable, the offload point device may send the first message to the UE so as to enable the UE to update the connection context information related to service(s) originally transmitted on the first air interface, thereby solving a problem that the first air interface is unavailable. As an operation of the UE corresponds to that of the offload point device, the operation of the UE may be referred to corresponding descriptions in the aforementioned methods 100, 300, 400 and 500 for brevity.

According to the method for data transmission provided by the embodiment of the present disclosure, when the user equipment finds that the first air interface is unavailable, the user equipment may update the connection context information corresponding to the service(s) carried on the first air interface according to the first message sent by the offload point device. In this way, the offload point device and the user equipment may continue to perform data transmission based on same connection context information, so that the service(s) currently carried on the first air interface may be processed, all the service(s) of the UE in correspondence to the data transmission via the first air interface are prevented from being interrupted, and continuity of the service(s) of the UE is guaranteed as much as possible, thereby help improving communication experience of a user.

Figure 11:
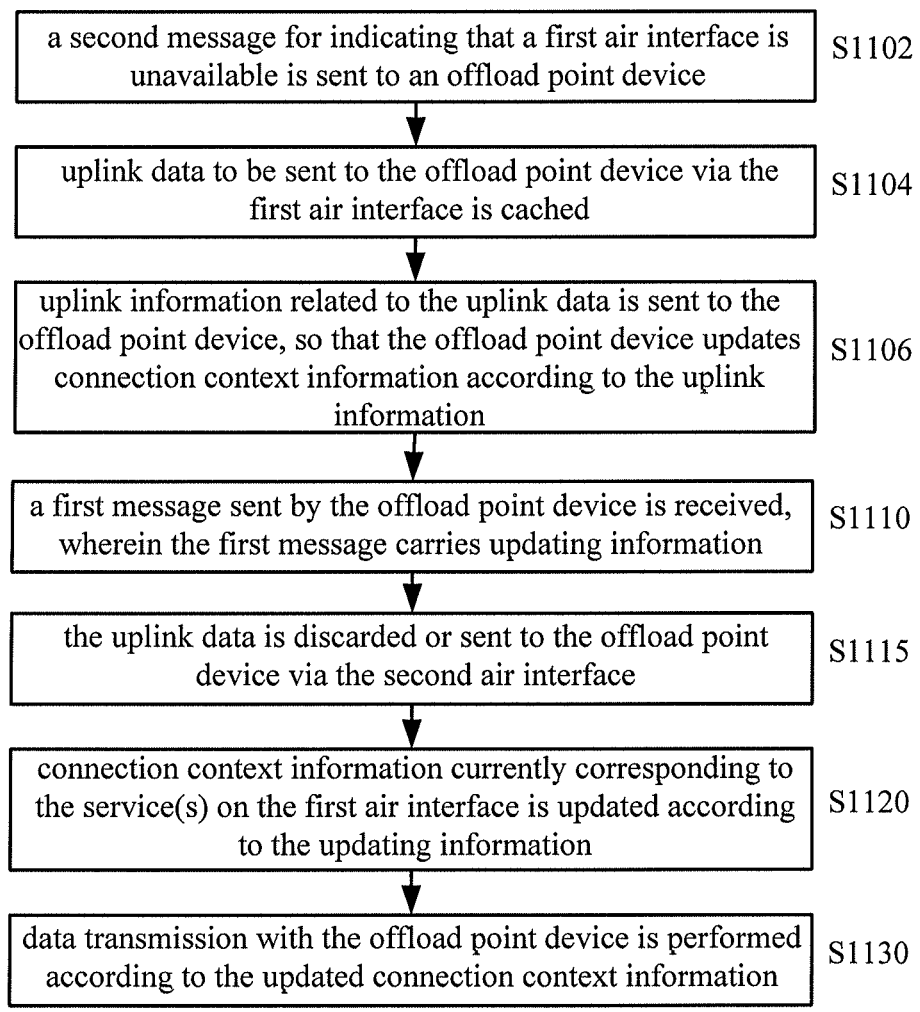
FIG. 11 is a flowchart of still yet another method for data transmission according to the embodiment of the present disclosure.

FIG. 11 is a flowchart of yet still another method 1100 for data transmission according to the embodiment of the present disclosure.

In S1102, a second message for indicating that a first air interface is unavailable is sent to an offload point device.

The UE may send the second message to the offload point device under a plurality of conditions of detecting that the first air interface is unavailable, for example, when a number of times a data packet is resent to an access device of the first air interface exceeds a predefined number of times, or when an amount of time spent in resending a data packet to an access device exceeds a first predefined period of time, or when a response returned by an access device is not received within a second predefined period of time. The aforementioned contents may be referred to the description in S502.

According to an embodiment of the present disclosure, the second message may be application layer signaling, and a header of a data packet carries a predefined identification to indicate that the data packet carries application layer signaling. For example, the application layer signaling may adopt the encapsulation format as shown in FIG. 9. By adopting the application layer signaling, an existing signaling structure is not affected, and the method is convenient to be realized.

In S1104, uplink data to be sent to the offload point device via the first air interface is cached.

When the UE detects that the first air interface is unavailable, the UE may cache the uplink data currently to be sent via the first air interface and wait for control of the offload point device to process the uplink data.

In S1106, uplink information related to the uplink data is sent to the offload point device, so that the offload point device updates connection context information according to the uplink information.

After the UE caches the uplink data, the UE may send the uplink information to the offload point device, and the uplink information may assist the offload point device in determining whether a service related to the uplink data is deleted or moved to a second air interface for transmission. The uplink information sent by the UE may include an amount of time spent in caching the uplink data, service(s) to which the uplink data belongs, data volume of the uplink data, QoS requirement of the uplink data, connection context information corresponding to the uplink data and the like. Please refer to the description in S420 for the aforementioned contents.

In S1110, a first message sent by the offload point device is received, wherein the first message carries updating information related to connection context information corresponding to service(s) of the user equipment on the first air interface that is updated by the offload point device when the first air interface is unavailable.

The updating information carried in the first message may be determined by the offload point device according to the uplink data reported by the UE, and the updating information may instruct the UE to update connection context information of the service(s) originally transmitted on the first air interface.

In S1115, when the connection context information indicated by the updating information shows that the uplink data include uplink data of a service of which connection context information is deleted, the uplink data is discarded; or when the connection context information indicated by the updating information shows that the uplink data includes uplink data of a service of which connection context information is changed to indicating a transmission via the second air interface, the uplink data is sent to the offload point device via the second air interface.

The UE processes the uplink data cached in S1104 according to the updated connection context information. S1115 may be executed after S1110, and has nothing to do with an execution sequence of S1120 and S1130.

In S1120, connection context information currently corresponding to the service(s) on the first air interface is updated according to the updating information.

After the UE receives the first message sent by the offload point device, as the updating information carried in the first message instructs how to update the connection context information, the UE updates the connection context information according to the updating information. For example, when the updating information instructs to delete connection context information of service A, the UE deletes the connection context information of the service A. For another example, when the updating information instructs to modify connection context information of service B to indicating a transmission via the second air interface, the UE performs corresponding modification on the connection context information of the service B.

In S1130, data transmission with the offload point device is performed according to the updated connection context information.

After the UE updates the connection context information, the UE performs subsequent data transmission with the offload point device according to the updated connection context information.

According to the method for data transmission provided by the embodiment of the present disclosure, the user equipment assists the offload point device in updating the connection context information by caching the uplink data and reporting the uplink information, so that the offload point device may consider how to update the connection context information more comprehensively, thus improving validity of update of the connection context information, reserving continuity of a service which meets the quality of service requirement, and interrupting a service which does not meet the QoS requirement is interrupted, thereby saving network resources.

The following describes block diagrams of structures of associated devices according to the embodiment of the present disclosure by referring to FIG. 12 to FIG. 16.

Figure 12:
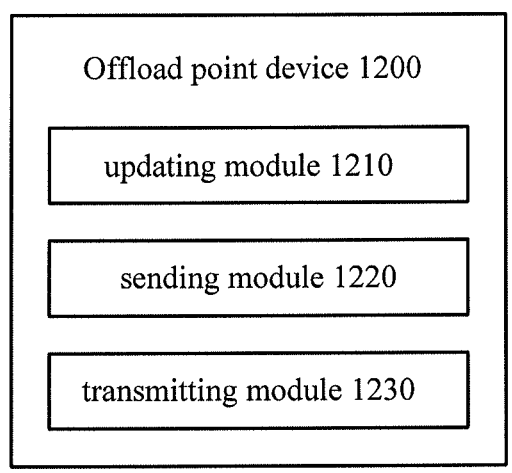
FIG. 12 is a block diagram of a structure of an offload point device according to the embodiment of the present disclosure.

FIG. 12 is a block diagram of a structure of an offload point device 1200 according to the embodiment of the present disclosure.

The offload point device 1200 may be a network device such as an RNC, an S-GW, a GGSN, an SGSN, a P-GW or the like. The offload point device 1200 may include an updating module 1210, a sending module 1220 and a transmitting module 1230, wherein the updating module 1210 may be realized with a processor, the sending module 1220 may be realized with a sending interface, and the transmitting module 1230 may be realized with a transceiving interface. The updating module 1210 may be used for updating connection context information corresponding to service(s) of a user equipment on a first air interface when the first air interface is unavailable, wherein the user equipment is connected to a core network through a first access network via the first air interface. The sending module 1220 may be used for sending a first message to the user equipment, wherein the first message carries updating information related to the updated connection context information, such that the user equipment updates connection context information currently corresponding to the service(s) on the first air interface according to the updating information so as to obtain the updated connection context information. The transmitting module 1230 may be used for performing data transmission with the user equipment according to the updated connection context information.

For the aforementioned and other operations and/or functions of the updating module 1210, the sending module 1220 and the transmitting module 1230, please refer to the description in the aforementioned method 100, and they are not described in detail herein for brevity.

According to the offload point device provided in the embodiment of the present disclosure, when the offload point device finds that the first air interface is unavailable, the offload point device may update the connection context information corresponding to the service(s) carried on the first air interface and inform the user equipment of the updated connection context information, in this way, the offload point device and the user equipment may continue to perform data transmission based on the same connection context information, thus the service(s) currently carried on the first air interface may be processed, all the service(s) of the UE in correspondence to the data transmission via the first air interface are prevented from being interrupted, and continuity of the service(s) of the UE is guaranteed as much as possible, thereby help improving communication experience of a user.

Figure 13:
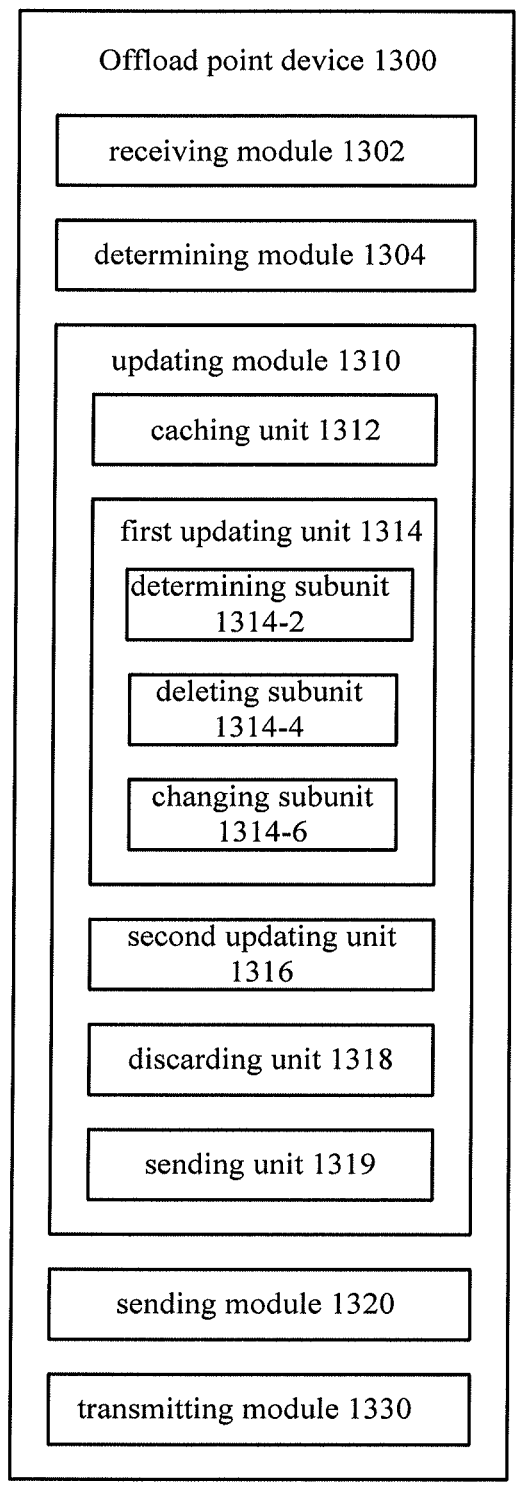
FIG. 13 is a block diagram of a structure of another offload point device according to the embodiment of the present disclosure.

FIG. 13 is a block diagram of a structure of an offload point device 1300 according to the embodiment of the present disclosure. An updating module 1310, a sending module 1320 and a transmitting module 1330 of the offload point device 1300 are basically the same as the updating module 1210, the sending module 1220 and the transmitting module 1230 of the offload point device 1200.

According to the embodiment of the present disclosure, the updating module 1310 includes a caching unit 1312 and a first updating unit 1314. The caching unit 1312 may be used for caching downlink data to be sent to the user equipment via the first air interface. The first updating unit 1314 may be used for updating connection context information corresponding to the service(s) in the first service set to which the downlink data belongs.

According to the embodiment of the present disclosure, besides through the first access network via the first air interface, the user equipment may also be connected to the core network through a second access network via a second air interface.

According to an embodiment of the present disclosure, the updating module 1310 may further include a second updating unit 1316. The second updating unit 1316 may be used for, if user equipment has other service(s) on the first air interface besides the service(s) in the first service set, deleting connection context information corresponding to other service(s), or changing connection context information corresponding to other service(s) to be a transmission via the second air interface.

According to an embodiment of the present disclosure, the first updating unit 1314 may include a determining subunit 1314-2, a deleting subunit 1314-4 and a changing subunit 1314-6. The determining subunit 1314-2 may be used for determining, according to downlink information related to the downlink data, whether QoS requirement is met when a service in the first service set is moved to the second air interface for transmission. The deleting subunit 1314-4 may be used for deleting connection context information corresponding to a service in the first service set which does not meet the quality of service requirement if being moved to the second air interface for transmission. The changing subunit 1314-6 may be used for changing connection context information corresponding to a service in the first service set, which meets the QoS requirement if being moved to the second air interface for transmission, from a transmission via the first air interface to a transmission via the second air interface.

According to an embodiment of the present disclosure, the updating module 1310 may further include a discarding unit 1318 and/or a sending unit 1319. The discarding unit 1318 may be used for discarding downlink data of the service in the first service set which does not meet the QoS requirement if being moved to the second air interface for transmission. The sending unit 1319 may be used for sending downlink data of the service in the first service set, which meets the QoS requirement if being moved to the second air interface for transmission, to the user equipment via the second air interface.

According to an embodiment of the present disclosure, the offload point device 1300 may further include a receiving module 1302 and a determining module 1304. The receiving module 1302 may be used for receiving a second message which is generated and sent by the user equipment and used for indicating that the first air interface is unavailable, or receiving a second message which is generated and sent by the access device of the first air interface and used for indicating that the first air interface is unavailable. The determining module 1304 may be used for determining that the first air interface is unavailable according to the second message.

For example, when the second message for indicating that the first air interface is unavailable is generated and sent by the user equipment, the receiving module 1302 may be used for receiving the second message indicating that the first air interface is unavailable which is generated and sent by the user equipment under one of the following situations: when a number of times a data packet is resent to the access device of the first air interface exceeds a predefined number of times, or when an amount of time in resending a data packet to the access device exceeds a first predefined period of time, or when a response, that is returned by the access device and used for responding to a data packet sent by the user equipment, is not received within a second predefined period of time. According to an embodiment of the present disclosure, the data packet sent by the UE may be a data packet for detecting the availability of the first air interface that is periodically generated and sent to the access device of the first air interface by the UE.

For another example, when the second message for indicating that the first air interface is unavailable is generated and sent by the access device of the first air interface, the receiving module 1302 may be used for receiving the second message indicating that the first air interface is unavailable which is generated and sent by the access device of the first air interface under one of the following situations: when a number of times a data packet is resent to the user equipment exceeds a predefined number of times, or when an amount of time in resending a data packet to the user equipment exceeds a first predefined period of time, or when a response, that is returned by the user equipment and used for responding to a data packet sent by the access device, is not received within a second predefined period of time. According to an embodiment of the present disclosure, the data packet sent by the access device of the first air interface may be may be a data packet for detecting the availability of the first air interface that is periodically generated and sent to the user equipment by the access device.

The second message received by the receiving module 1302 may be application layer signaling, and a header of a data packet carries a predefined identification to indicate that the data packet carries application layer signaling.

For the aforementioned and other operations and/or functions of the caching unit 1312, the first updating unit 1314, the second updating unit 1316, the determining subunit 1314-2, the deleting subunit 1314-4, the changing subunit 1314-6, the discharging unit 1318, the sending unit 1319, the receiving module 1302 and the determining module 1304, please refer to the descriptions in the methods 100, 300 and 500, and they are not described in detail herein for brevity.

According to the offload point device provided by the embodiment of the present disclosure, by determining how to update the connection context information of the service corresponding to the downlink data cached by the offload point device and to the uplink data cached by the UE according to the QoS requirement, the service on the first air interface may be efficiently processed, and continuity of the service is maintained as much as possible without producing adverse effects on the quality of service of the service, thereby utilizing network resources more efficiently, and preventing the network resources from being wasted in transmitting the service which does not meet the QoS requirement.

Figure 14:
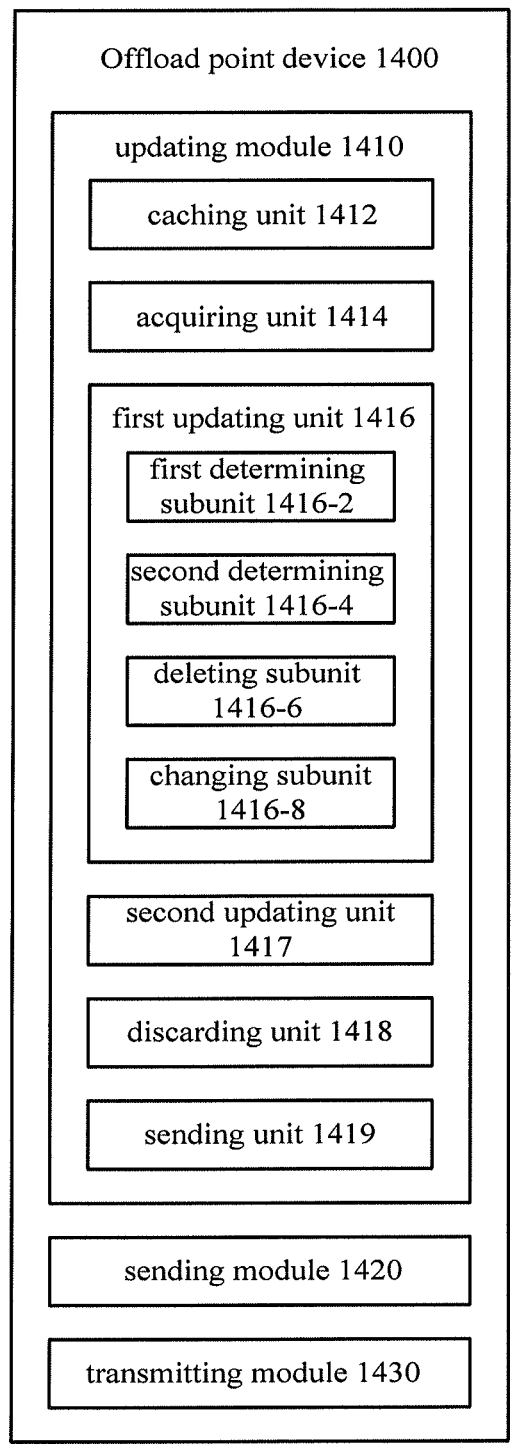
FIG. 14 is a block diagram of a structure of yet another offload point device according to the embodiment of the present disclosure.

FIG. 14 is a block diagram of structure of an offload point device 1400 according to the embodiment of the present disclosure. An updating module 1410, a sending module 1420 and a transmitting module 1430 of the offload point device 1400 are basically the same as the updating module 1210, the sending module 1220 and the transmitting module 1230 of the offload point device 1200.

According to the embodiment of the present disclosure, the updating module 1410 may include a caching unit 1412, an acquiring unit 1414 and a first updating unit 1416. The caching unit 1412 may be used for caching downlink data to be sent to the user equipment via the first air interface. The acquiring unit 1414 may be used for acquiring uplink information related to uplink data cached by the user equipment. The first updating unit 1416 may be used for updating connection context information corresponding to service(s) in a first service set to which the downlink data belongs and that corresponding to a service in a second service set based on the uplink information.

According to the embodiment of the present disclosure, besides through the first access network via the first air interface, the user equipment may also be connected to the core network through a second access network via a second air interface.

According to an embodiment of the present disclosure, the updating module 1410 may further include a second updating unit 1417. The second updating unit 1417 may be used for, if the user equipment has other service(s) on the first air interface besides the services in the first service set and in the second service set, deleting connection context information corresponding to the other service(s), or changing connection context information corresponding to the other service(s) to a transmission via the second air interface.

According to an embodiment of the present disclosure, the first updating module 1416 may include a first determining subunit 1416-2, a second determining subunit 1416-4, a deleting subunit 1416-6 and a changing subunit 1416-8. The first determining subunit 1416-2 may be used for determining, according to downlink information related to the downlink data, whether QoS requirement is met when a service in the first service set is moved to the second air interface for transmission. The second determining subunit 1416-4 may be used for determining, according to the uplink information, whether the QoS requirement is met when a service in the second service set is moved to the second air interface for transmission. The deleting subunit 1416-6 may be used for deleting connection context information corresponding to services in the first service set and in the second service set which do not meet the QoS requirement if being moved to the second air interface for transmission. The changing subunit 1416-8 may be used for changing connection context information corresponding to services in the first service set and in the second service set which meet the QoS requirement if being moved to the second air interface for transmission, from a transmission via the first air interface to a transmission via the second air interface.

According to an embodiment of the present disclosure, the updating module 1410 may further include a discarding unit 1418 and/or a sending unit 1419. The discarding unit 1418 may be used for discarding downlink data of the service in the first service set which does not meet the QoS requirement if being moved to the second air interface for transmission. The sending unit 1419 may be used for sending downlink data of the service in the first service set, which meets the QoS requirement if being moved to the second air interface for transmission, to the user equipment via the second air interface.

For the aforementioned and other operations and/or functions of the caching unit 1412, the acquiring unit 1414, the first updating unit 1416, the second updating unit 1417, the first determining subunit 1416-2, the second determining subunit 1416-4, the deleting subunit 1416-6, the changing subunit 1416-8, the discharging unit 1418 and the sending unit 1419, please refer to the description in the method 400, and they are not described in detail herein for brevity.

According to the offload point device provided by the embodiment of the present disclosure, by determining how to update the connection context information of the service corresponding to the downlink data cached by the offload point device and to the uplink data cached by the UE according to the QoS requirement, the service on the first air interface may be efficiently processed, and continuity of the service is maintained as much as possible without producing adverse effects on the quality of service of the service, thereby utilizing network resources more efficiently, and preventing the network resources from being wasted in transmitting the service which does not meet the QoS requirement.

Figure 15:
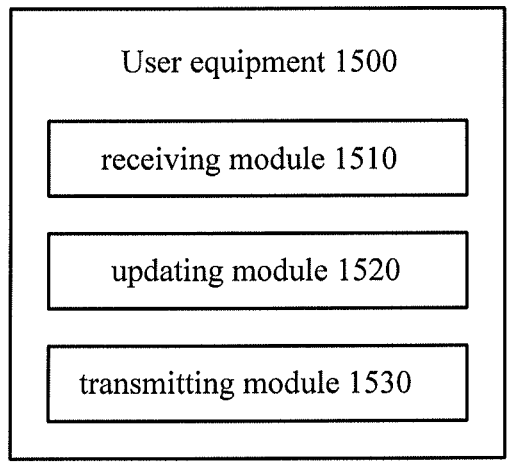
FIG. 15 is a block diagram of a structure of a user equipment according to the embodiment of the present disclosure.

FIG. 15 is a block diagram of a structure of a user equipment 1500 according to the embodiment of the present disclosure.

The user equipment 1500 may be a device such as a mobile phone, a personal computer, a digital assistant or the like. The user equipment 1500 may include a receiving module 1510, an updating module 1520 and a transmitting module 1530, wherein the receiving module 1510 may be realized with a receiving interface, the updating module 1520 may be realized with a processor, and the transmitting module 1530 may be realized with a transceiving interface. The receiving module 1510 may be used for receiving, when a first air interface is unavailable, a first message sent by an offloading point device, wherein the first message carries updating information related to connection context information corresponding to service(s) of the user equipment on the first air interface that is updated by the offloading point device when the first air interface is unavailable, and the user equipment is connected to a core network through a first access network via the first air interface. The updating module 1520 may be used for updating, according to the updating information, connection context information currently corresponding to the service(s) on the first air interface. The transmitting module 1530 may be used for performing data transmission with the offloading point device according to the updated connection context information.

For the aforementioned and other operations and/or functions of the receiving module 1510, the updating module 1520 and the transmitting module 1530, please refer to the description in the aforementioned method 1000, and they are not described in detail herein for brevity.

According to the user equipment provided by the embodiment of the present disclosure, when the user equipment finds that the first air interface is unavailable, the user equipment may update the connection context information corresponding to the service(s) carried on the first air interface according to the first message sent by the offload point device, in this way, the offload point device and the user equipment may continue to perform data transmission based on the same connection context information, thus the service(s) currently carried on the first air interface may be processed, all the service(s) of the UE in correspondence to the data transmission via the first air interface are prevented from being interrupted, and continuity of the service(s) of the UE is guaranteed as much as possible, thereby help improving communication experience of a user.

Figure 16:
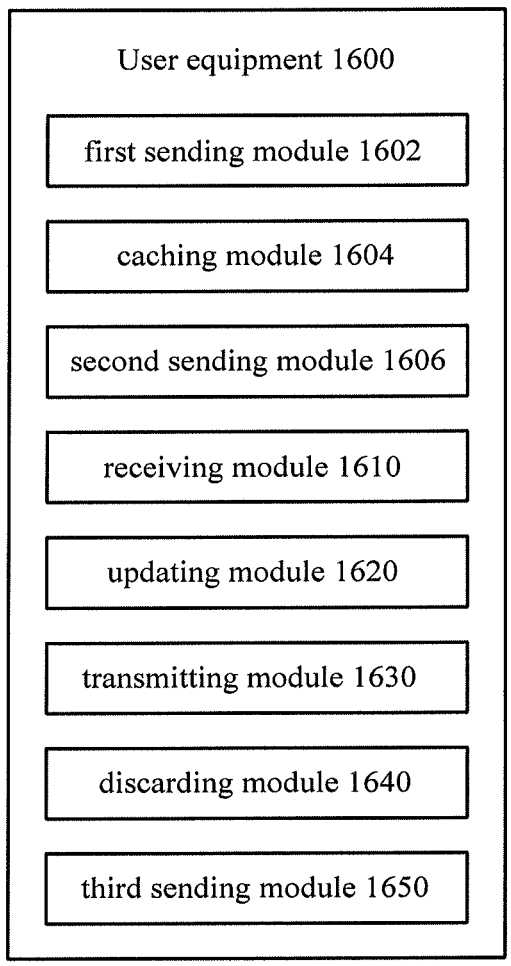
FIG. 16 is a block diagram of a structure of another user equipment according to the embodiment of the present disclosure.

FIG. 16 is a block diagram of a structure of a user equipment 1600 according to the embodiment of the present disclosure. A receiving module 1610, an updating module 1620 and a transmitting module 1630 of the user equipment 1600 are basically the same as the receiving module 1510, the updating module 1520 and the transmitting module 1530 of the user equipment 1500.

According to an embodiment of the present disclosure, the user equipment 1600 may further include a first sending module 1602. The first sending module 1602 may be used for sending a second message for indicating that the first air interface is unavailable to the offload point device when a number of times a data packet is resent to an access device of the first air interface exceeds a predefined number of times, or used for sending a second message for indicating that the first air interface is unavailable to the offload point device when an amount of time in resending a data packet to an access device exceeds a first predefined period of time, or used for sending a second message for indicating that the first air interface is unavailable to the offload point device when a response, that is returned by an access device and used for responding to a data packet sent by the user equipment, is not received within a second predefined period of time.

According to an embodiment of the present disclosure, the second message may be application layer signaling, and a header of a data packet carries a predefined identification to indicate that the data packet carries application layer signaling.

According to an embodiment of the present disclosure, the user equipment 1600 may further include a caching module 1604. The caching module 1604 may be used for caching uplink data to be sent to the offload point device via the first air interface.

According to an embodiment of the present disclosure, the user equipment 1600 may further include a c. The second sending module 1606 may be used for sending uplink information related to the uplink data to the offload point device, so that the offload point device updates the connection context information according to the uplink information.

According to the embodiment of the present disclosure, besides through the first access network via the first air interface, the user equipment 1600 may also be connected to the core network through a second access network via a second air interface.

According to an embodiment of the present disclosure, the user equipment 1600 may further include a discarding module 1640 and/or a third sending module 1650. The discarding module 1640 may be used for discarding the uplink data when the connection context information indicated by the updating information shows that the uplink data includes uplink data of a service of which connection context information is deleted. The third sending module 1650 may be used for sending the uplink data to the offload point device via the second air interface when the connection context information indicated by the updating information shows that the uplink data includes uplink data of a service of which connection context information is changed to a transmission via the second air interface.

For the aforementioned and other operations and/or functions of the first sending module 1602, the caching module 1604, the second sending module 1606, the discarding module 1640 and the third sending module 1650, please refer to the description in the aforementioned method 1100, and they are not described in detail herein for brevity.

According to the user equipment provided by the embodiment of the present disclosure, the user equipment assists the offload point device in updating the connection context information by caching the uplink data and reporting the uplink information, so that the offload point device may consider how to update the connection context information more comprehensively, thus improving validity of update of the connection context information, reserving continuity of the service which meets the quality of service requirement, and interrupting the service which does not meet the QoS requirement is interrupted, thereby saving network resources.

Figure 17:
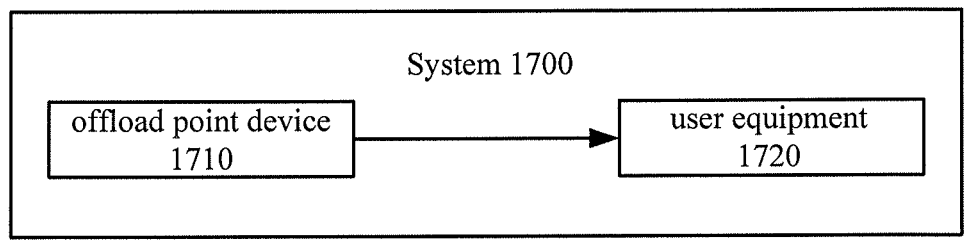
FIG. 17 is a schematic view of a system for data transmission according to the embodiment of the present disclosure.

The following describes a schematic view of a system 1700 for data transmission according to the embodiment of the present disclosure by referring to FIG. 17.

The system 1700 includes an offload point device 1710 and a user equipment 1720.

The offload point device 1710 is used for updating, when a first air interface is unavailable, connection context information corresponding to service(s) of a user equipment on the first air interface, wherein the user equipment 1720 is connected to a core network through a first access network via the first air interface; sending a first message to the user equipment 1720, wherein the first message carries updating information related to the updated connection context information, such that the user equipment 1720 updates connection context information currently corresponding to the service(s) on the first air interface according to the updating information so as to obtain the updated connection context information; and performing data transmission with the user equipment 1720 according to the updated connection context information.

The user equipment 1720 is used for receiving a first message sent by an offload point device 1710 when a first air interface is unavailable, wherein the first message carries updating information related to connection context information corresponding to service(s) of the user equipment on the first air interface that is updated by the offload point device when the first air interface is unavailable, and the user equipment is connected to a core network through a first access network via the first air interface; updating, according to the updating information, connection context information currently corresponding to the service(s) on the first air interface; and performing data transmission with the offload point device according to the updated connection context information.

For the aforementioned and other operations and/or functions of the offload point device 1710, please refer to the descriptions in the aforementioned methods 100, 300, 400 and 500, and for the aforementioned and other operations and/or functions of the user equipment 1720, please refer to the descriptions in the aforementioned methods 1000 and 1100.

According to the system for data transmission provided by the embodiment of the present disclosure, when the offload point device finds that the first air interface is unavailable, the offload point device may update the connection context information corresponding to the service(s) carried on the first air interface and inform the user equipment of the updated connection context information, in this way, the offload point device and the user equipment may continue to perform data transmission based on the same connection context information, thus the service(s) currently carried on the first air interface may be processed, all the service(s) of the UE in correspondence to the data transmission via the first air interface are prevented from being interrupted, and continuity of the service(s) of the UE is guaranteed as much as possible, thereby help improving communication experience of a user.

Those ordinary skilled in the art may realize that the steps of the respective methods and units described in conjunction with the embodiments disclosed in the present disclosure may be realized with electronic hardware, computer software or combination of the two. In order to clearly illustrate the interchangeability of hardware and software, the steps and composition of the respective embodiments have already been described generally according to functions in the above-mentioned illustrations. Whether these functions are executed in a form of a hardware or a software depends on the specific applications and design constraint conditions of the technical solution. For each specific application, persons skilled in the art may implement the described functions by different methods, but this implementation shall not be considered as beyond the scope of the present disclosure.

The steps of the methods described in conjunction with the embodiments disclosed in the present disclosure may be implemented with a hardware, a software program executed by a processor or the combination of the two. The software program may be equipped in a random access memory (RAM), a memory, a read-only memory (ROM), an electrically programmable ROM, an electrically erasable programmable ROM, a register, a hard disk, a mobile disk, a CD-ROM or any storage medium in other forms as known in the technical field.

Although some embodiments of the present disclosure are shown and described, those skilled in the art should understand that these embodiments may be modified without departing from the principle and spirits of the present disclosure, and these modifications should fall into the scope of the present disclosure.

What is claimed is:

1. A method performed when communicating information between a network device and a user equipment (UE) that is capable of communicating data via first and second air interfaces, the method comprising:

when the first air interface is unavailable, updating, by a network device, connection context information that defines parameters associated with one or more services of the UE that utilize the first air interface, wherein the UE is connected to a core network through a first access network via the first air interface;

caching, by an offload point device, downlink data to be sent to the UE via the first air interface, wherein the offload point device is the network device;

determining, by the network device, whether quality of service (QOS) requirements associated with the one or more services will be met if the services are transitioned to the second air interface;

when the network device determines that the QOS associated with at least one service will be met, communicating a first message to the UE to instruct the UE to communicate data associated with the at least one service via the second air interface rather than the first air interface, wherein the first message carries updating information related to the updated connection context information, such that the UE updates connection context information corresponding to the one or more services on the first air interface according to the updating information so as to obtain the updated connection context information; and performing, by the network device, data transmission with the UE to send the cashed downlink data to the UE according to the updated connection context information.

2. The method according to claim 1, wherein the updating the connection context information corresponding to the one or more services of the UE on the first air interface comprises:

updating connection context information corresponding to one or more services in a first service set to which the downlink data belongs.

3. The method according to claim 2, wherein the UE is further connected to the core network through a second access network via the second air interface; and wherein the updating connection context information corresponding to one or more services in a first service set to which the downlink data belongs comprises:

determining, according to downlink information related to the downlink data, whether the quality of service requirement is met when a service in the first service set is moved to the second air interface for transmission;

deleting connection context information corresponding to the service in the first service set which does not meet the quality of service requirement if being moved to the second air interface for transmission; and changing connection context information corresponding to the service in the first service set, which meets the quality of service requirement if being moved to the second air interface for transmission, from a transmission via the first air interface to a transmission via the second air interface.

4. The method according to claim 3, wherein the updating the connection context information corresponding to the service of the UE on the first air interface, further comprises one of:

discarding downlink data of the service in the first service set which does not meet the quality of service requirement if being moved to the second air interface for transmission; and sending downlink data of the service in the first service set, which meets the quality of service requirement if being moved to the second air interface for transmission, to the UE via the second air interface.

5. The method according to claim 1, wherein the updating the connection context information corresponding to the one or more services of the UE on the first air interface, comprises:

acquiring uplink information related to uplink data cached by the UE; and updating connection context information corresponding to one or more services in a first service set to which the downlink data belongs and that corresponding to one or more services in a second service set based on the uplink information.

6. The method according to claim 5, wherein the UE is further connected to the core network through a second access network via the second air interface; and wherein the updating connection context information corresponding to one or more services in a first service set to which the downlink data belongs and that corresponding to the service in a second service set based on the uplink information comprises:

determining, according to downlink information related to the downlink data, whether the quality of service requirement is met when a service in the first service set is moved to the second air interface for transmission;

determining, according to the uplink information, whether the quality of service requirement is met when a service in the second service set is moved to the second air interface for transmission;

deleting connection context information corresponding to services in the first service set and in the second service set which do not meet the quality of service requirement if being moved to the second air interface for transmission; and changing connection context information corresponding to services in the first service set and in the second service set which meet the quality of service requirement if being moved to the second air interface for transmission, from a transmission via the first air interface to a transmission via the second air interface.

7. The method according to claim 1, before the updating the connection context information corresponding to the one or more services of the UE on the first air interface, further comprising:

receiving a second message that is generated and sent by one of the UE and an access device of the first air interface, and used for indicating that the first air interface is unavailable; and determining that the first air interface is unavailable according to the second message.

8. The method according to claim 7, wherein the receiving a second message that is generated and sent by the UE and used for indicating that the first air interface is unavailable, comprises:

receiving the second message for indicating that the first air interface is unavailable which is generated and sent by the UE under one of the following situations:

when a number of times a data packet is resent to the access device of the first air interface exceeds a predefined number of times, when an amount of time in resending a data packet to the access device exceeds a first predefined period of time, and when a response, that is returned by the access device and used for responding to a data packet sent by the UE, is not received within a second predefined period of time; and wherein the receiving a second message that is generated and sent by an access device of the first air interface and used for indicating that the first air interface is unavailable, comprises:
   receiving the second message for indicating that the first air interface is unavailable which is generated and sent by the access device of the first air interface under one of the following situations:
   when a number of times a data packet is resent to the UE exceeds a predefined number of times,
   when an amount of time in resending a data packet to the UE exceeds a first predefined period of time, and
   when a response, that is returned by the UE and used for responding to a data packet sent by the access device, is not received within a second predefined period of time.

9. The method according to claim 7, wherein the second message is application layer signaling, and a header of a data packet carries a predefined identity to indicate that the data packet carries application layer signaling.

10. A method performed when communicating information between a network device and a user equipment (UE) capable of communicating data via first and second air interfaces, the method, comprising:
   receiving, by the UE, a first message from an offload point device when the first air interface is unavailable, wherein the first message carries updating information related to connection context information that defines parameters associated with one or more services of the UE on the first air interface that is updated by the offload point device when the first air interface is unavailable, and the UE is connected to a core network through a first access network via the first air interface;
   caching uplink data to be sent to the offload point device via the first air interface;
   determining whether quality of service (QOS) requirements associated with the one or more services will be met if the one or more services are transitioned to the second air interface;
   when the QOS associated with at least one service is determined to be met, updating, by the UE, the connection context information corresponding to the one or more services to indicate that communications associated with the one or more services will occur over the second air interface rather than the first air interface; and
   performing, by the UE, data transmission with the offload point device to send the cashed uplink data according to the updated connection context information.

11. The method according to claim 10, before the receiving the first message sent by the offload point device, further comprising one of:
   sending, by the UE, a second message for indicating that the first air interface is unavailable to the offload point device when a number of times a data packet is resent to an access device of the first air interface exceeds a predefined number of times;
   sending, by the UE, a second message for indicating that the first air interface is unavailable to the offload point device when an amount of time in resending a data packet to an access device exceeds a first predefined period of time; and sending, by the UE, a second message for indicating that the first air interface is unavailable to the offload point device when a response, that is returned by an access device and used for responding to a data packet sent by the UE, is not received within a second predefined period of time.

12. The method according to claim 11, wherein the second message is application layer signaling, and a header of a data packet carries a predefined identification to indicate that the data packet carries application layer signaling.

13. The method according to claim 10, after the caching uplink data to be sent to the offload point device via the first air interface, further comprising:
   sending uplink information related to the uplink data to the offload point device, so that the offload point device updates connection context information according to the uplink information.

14. The method according to claim 10, wherein the UE is further connected to the core network through a second access network via the second air interface; and
   wherein after the receiving the first message sent by the offload point device, the method further comprises one of:
   discarding the uplink data when the connection context information indicated by the updating information shows that the uplink data includes uplink data of the service of which connection context information is deleted; and
   sending the uplink data to the offload point device via the second air interface when the connection context information indicated by the updating information shows that the uplink data includes uplink data of the service of which connection context information is changed to a transmission via the second air interface.

15. An offload point device that communicates with a user equipment (UE), the UE being capable of communicating data via first and second air interfaces, comprising a non-transitory storage medium comprising:
   an updating module comprising one or more units that are realized with electronic hardware, configured to update, when a first air interface is unavailable, connection context information that defines parameters associated with one or more services of the UE that utilize the first air interface, wherein the UE is connected to a core network through a first access network via the first air interface, wherein the updating module comprises a caching unit that is realized with electronic hardware and is configured to cache downlink data to be sent to the UE via the first air interface by using the offload point device;
   a sending module comprising one or more units that are realized with electronic hardware, configured to:
      determine whether quality of service (QOS) requirements associated with the one or more services will be met if the services are transitioned to the second air interface;
      when the sending module determines that the QOS associated with at least one service will be met communicating a first message to the UE to instruct the UE to communicate data associated with the at least one service via the second air interface rather than the first air interface, wherein the first message carries updating information related to the updated connection context information, such that the UE updates connection context information corresponding to the one or more services on the first air interface according to the updating information so as to obtain the updated connection context information; and
   a transmitting module comprising one or more units that are realized with electronic hardware, configured to perform data transmission with the UE to send the cashed downlink data to the UE according to the updated connection context information.

16. The offload point device according to claim 15, wherein the updating module comprises:
a first updating unit that is realized with electronic hardware, configured to update connection context information corresponding to one or more services in a first service set to which the downlink data belongs.

17. The offload point device according to claim 16, wherein the UE is further connected to the core network through a second access network via the second air interface; and
wherein the first updating unit comprises:
a determining subunit that is realized with electronic hardware, configured to determine, according to downlink information related to the downlink data, whether the quality of service requirement is met when the service in the first service set is moved to the second air interface for transmission;
a deleting subunit that is realized with electronic hardware, configured to delete connection context information corresponding to a service in the first service set which does not meet the quality of service requirement if being moved to the second air interface for transmission; and
a changing subunit that is realized with electronic hardware, configured to change connection context information corresponding to a service in the first service set, which meets the quality of service requirement if being moved to the second air interface for transmission, from a transmission via the first air interface to a transmission via the second air interface.

18. The offload point device according to claim 17, wherein the updating module further comprises one of:
a discarding unit that is realized with electronic hardware, configured to discard downlink data of the service in the first service set which does not meet the quality of service requirement if being moved to the second air interface for transmission; and
a sending unit that is realized with electronic hardware, configured to send downlink data of the service in the first service set, which meets the quality of service requirement if being moved to the second air interface for transmission, to the UE via the second air interface.

19. The offload point device according to claim 15, wherein the updating module comprises:
an acquiring unit that is realized with electronic hardware, configured to acquire uplink information related to uplink data cached by the UE; and
a first updating unit that is realized with electronic hardware, configured to update connection context information corresponding to one or more services in a first service set to which the downlink data belongs and that corresponding to one or more services in a second service set based on the uplink information.

20. The offload point device according to claim 19, wherein the UE is further connected to the core network through a second access network via the second air interface; and
wherein the first updating unit comprises:
a first determining subunit that is realized with electronic hardware, configured to determine, according to downlink information related to the downlink data, whether the quality of service requirement is met when the service in the first service set is moved to the second air interface for transmission;
a second determining subunit that is realized with electronic hardware, configured to determine, according to the uplink information, whether the quality of service requirement is met when the service in the second service set is moved to the second air interface for transmission;
a deleting subunit that is realized with electronic hardware, configured to delete connection context information corresponding to services in the first service set and in the second service set which do not meet the quality of service requirement if being moved to the second air interface for transmission; and
a changing subunit that is realized with electronic hardware, configured to change connection context information corresponding to services in the first service set and in the second service set which meet the quality of service requirement if being moved to the second air interface for transmission, from a transmission via the first air interface to a transmission via the second air interface.

21. The offload point device according to claim 15, further comprising:
a receiving module comprising one or more units that are realized with electronic hardware, configured to receive a second message that is generated and sent by the UE and used for indicating that the first air interface is unavailable, or receiving a second message that is generated and sent by an access device of the first air interface and used for indicating that the first air interface is unavailable; and
a determining module comprising one or more units that are realized with electronic hardware, configured to determine that the first air interface is unavailable according to the second message.

22. The offload point device according to claim 21, wherein the receiving module is configured to receive the second message for indicating that the first air interface is unavailable which is generated and sent by the UE under one of the following situations:
when a number of times a data packet is resent to the access device of the first air interface exceeds a predefined number of times,
when an amount of time in resending a data packet to the access device exceeds a first predefined period of time, and
when a response, that is returned by the access device and used for responding to a data packet sent by the UE, is not received within a second predefined period of time.

23. The offload point device according to claim 21, wherein the receiving module is configured to receive the second message for indicating that the first air interface is unavailable which is generated and sent by the access device of the first air interface under one of the following situations:
when a number of times a data packet is resent to the UE exceeds a predefined number of times,
when an amount of time in resending a data packet to the UE exceeds a first predefined period of time, and
when a response, that is returned by the UE and used for responding to a data packet sent by the access device, is not received within a second predefined period of time.

24. The offload point device according to claim 21, wherein the second message is application layer signaling, and a header of a data packet carries a predefined identification to indicate that the data packet carries application layer signaling.

25. A user equipment (UE) capable of communicating data via first and second air interfaces, comprising a non-transitory storage medium comprising:
- a receiving module comprising one or more units that are realized with electronic hardware, configured to cause the UE to receive a first message from an offload point device when the first air interface is unavailable, wherein the first message carries updating information related to connection context information that defines parameters associated with one or more services of the UE on the first air interface that is updated by the offload point device when the first air interface is unavailable, and the UE is connected to a core network through a first access network via the first air interface;
- a caching module comprising one or more units that are realized with electronic hardware, configured to cache uplink data to be sent to the offload point device via the first air interface;
- determining whether quality of service (QOS) requirements associated with the one or more services will be met if the services are transitioned to the second air interface;
- an updating module comprising one or more units that are realized with electronic hardware, configured to cause the UE to:
  - determine whether quality of service (QOS) requirements associated with the one or more services will be met if the services are transitioned to the second air interface;
  - when the QOS associated with at least one service is determined to be met update the connection context information corresponding to the one or more services to indicate that communications associated with the one or more services will occur over the second air interface rather than the first air interface; and
- a transmitting module comprising one or more units that are realized with electronic hardware, configured to perform data transmission with the offload point device to send the cashed downlink data according to the updated connection context information.

26. The UE according to claim 25, further comprising: a first sending module comprising one or more units that are realized with electronic hardware, configured to send a second message for indicating that the first air interface is unavailable to the offload point device when one of the following condition is met:
- when a number of times a data packet is resent to an access device of the first air interface exceeds a predefined number of times;
- when an amount of time in resending a data packet to an access device exceeds a first predefined period of time; and
- when a response, that is returned by an access device and used for responding to a data packet sent by the UE, is not received within a second predefined period of time.

27. The UE according to claim 26, wherein the second message is application layer signaling, and a header of a data packet carries a predefined identification to indicate that the data packet carries application layer signaling.

28. The UE according to claim 25, further comprising:
- a second sending module comprising one or more units that are realized with electronic hardware, configured to send uplink information related to the uplink data to the offload point device, so that the offload point device updates connection context information according to the uplink information.

29. The UE according to claim 25, wherein the UE is further connected to the core network through a second access network via the second air interface; and
wherein the UE further comprises one of:
- a discarding module comprising one or more units that are realized with electronic hardware, configured to discard the uplink data when the connection context information indicated by the updating information shows that the uplink data includes uplink data of the service of which connection context information is deleted; and
- a third sending module comprising one or more units that are realized with electronic hardware, configured to send the uplink data to the offload point device via the second air interface when the connection context information indicated by the updating information shows that the uplink data includes uplink data of the service of which connection context information is changed to a transmission via the second air interface.

* * * * *

UNITED STATES PATENT AND TRADEMARK OFFICE
CERTIFICATE OF CORRECTION

PATENT NO. : 9,451,516 B2
APPLICATION NO. : 14/189539
DATED : September 20, 2016
INVENTOR(S) : Ye Wu et al.

Page 1 of 1

It is certified that error appears in the above-identified patent and that said Letters Patent is hereby corrected as shown below:

On the Title Page

Left column, insert a new item as follows:
-- Related U.S. Application Data
Continuation of International Application No. PCT/CN2012/080635, filed on August 27, 2012. --.

Signed and Sealed this
Twentieth Day of March, 2018

Andrei Iancu
*Director of the United States Patent and Trademark Office*